United States Patent
Wu et al.

(10) Patent No.: US 12,058,019 B2
(45) Date of Patent: Aug. 6, 2024

(54) QUALITY OF SERVICE MONITORING METHOD AND SYSTEM, AND DEVICE

(71) Applicant: Huawei Technologies Co., Ltd., Shenzhen (CN)

(72) Inventors: Wenfu Wu, Shanghai (CN); Han Zhou, Shanghai (CN); Hancheng Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/138,264

(22) Filed: Dec. 30, 2020

(65) Prior Publication Data

US 2021/0119896 A1  Apr. 22, 2021

Related U.S. Application Data

(63) Continuation of application No. PCT/CN2019/100242, filed on Aug. 12, 2019.

(30) Foreign Application Priority Data

Aug. 13, 2018 (CN) .......................... 201810918390.9
Jan. 11, 2019 (CN) .......................... 201910028864.7

(51) Int. Cl.
*H04L 43/0852* (2022.01)
*H04L 41/0894* (2022.01)
(Continued)

(52) U.S. Cl.
CPC ...... *H04L 43/0858* (2013.01); *H04L 41/0894* (2022.05); *H04L 41/5009* (2013.01);
(Continued)

(58) Field of Classification Search
CPC . H04L 43/0858; H04L 41/5009; H04L 43/06; H04L 43/0864; H04L 41/0893;
(Continued)

(56) References Cited

U.S. PATENT DOCUMENTS

| | | | |
|---|---|---|---|
| 10,547,504 B2 | 1/2020 | Wang et al. | |
| 2015/0215733 A1* | 7/2015 | Wigren | H04W 64/00 455/456.1 |

(Continued)

FOREIGN PATENT DOCUMENTS

| | | |
|---|---|---|
| CN | 101296404 A | 10/2008 |
| CN | 101304544 A | 11/2008 |

(Continued)

OTHER PUBLICATIONS

"LTE Network Architecture: Basic". Part 4. Traffic Flow on the LTE Network (Year: 2013).*
(Continued)

*Primary Examiner* — Jay L Vogel
(74) *Attorney, Agent, or Firm* — Conley Rose, P.C.

(57) ABSTRACT

A quality of service monitoring method, system, and a device, where the quality of service monitoring method includes: obtaining, by a first device, information about a first transmission delay for packet transmission between the first device and a second device for a terminal; sending, by the first device, the information about the first transmission delay to a third device; and sending, by the first device at a first moment, information related to the first moment to the third device, where the information about the first transmission delay and the information related to the first moment are used to determine information about a second transmission delay for packet transmission between the second device and the third device for the terminal.

22 Claims, 12 Drawing Sheets

(51) Int. Cl.
  *H04L 41/5009* (2022.01)
  *H04L 43/06* (2022.01)
  *H04W 24/02* (2009.01)
  *H04W 24/08* (2009.01)
  *H04W 24/10* (2009.01)
  *H04L 43/0823* (2022.01)
  *H04L 43/0864* (2022.01)
  *H04L 43/0894* (2022.01)

(52) U.S. Cl.
  CPC .......... *H04L 43/06* (2013.01); *H04L 43/0852* (2013.01); *H04W 24/02* (2013.01); *H04W 24/08* (2013.01); *H04W 24/10* (2013.01); *H04L 43/0823* (2013.01); *H04L 43/0864* (2013.01); *H04L 43/0894* (2013.01)

(58) Field of Classification Search
  CPC ............. H04L 43/0823; H04L 43/0894; H04L 43/0852; H04W 24/02; H04W 24/08; H04W 24/01
  See application file for complete search history.

(56) References Cited

U.S. PATENT DOCUMENTS

| | | | |
|---|---|---|---|
| 2016/0198482 | A1 | 7/2016 | Kimura et al. |
| 2016/0327628 | A1* | 11/2016 | Perez-Cruz .......... H04W 24/06 |
| 2018/0199240 | A1 | 7/2018 | Dao et al. |
| 2018/0199398 | A1 | 7/2018 | Dao et al. |
| 2018/0278507 | A1 | 9/2018 | Sintorn et al. |
| 2018/0338338 | A1* | 11/2018 | Baillargeon .......... H04L 43/103 |
| 2018/0376384 | A1* | 12/2018 | Youn ................. H04W 36/0022 |
| 2019/0159227 | A1* | 5/2019 | Talebi Fard .......... H04W 76/00 |
| 2020/0076727 | A1* | 3/2020 | Filsfils ................... H04L 45/34 |
| 2020/0107225 | A1 | 4/2020 | Zhang et al. |
| 2021/0144663 | A1* | 5/2021 | Liu ....................... H04L 43/106 |
| 2021/0153070 | A1* | 5/2021 | Velev ............... H04W 28/0268 |

FOREIGN PATENT DOCUMENTS

| | | |
|---|---|---|
| CN | 101925126 A | 12/2010 |
| CN | 103298028 A | 9/2013 |
| CN | 105072629 A | 11/2015 |
| CN | 108141386 A | 6/2018 |
| CN | 108632904 A | 10/2018 |
| RU | 2538947 C1 | 1/2015 |
| WO | 02085051 A1 | 10/2002 |
| WO | 2015019728 A1 | 2/2015 |
| WO | WO-2020036928 A1 * | 2/2020 |

OTHER PUBLICATIONS

EEE Std 802.1AS-2011/Cor Jan. 2013, (Corrigendum to IEEE Std 802.1AS-2011). "IEEE Standard for Local and metropolitan area networks, Timing and Synchronization for Time-Sensitive Applications in Bridged Local Area Networks, Corrigendum1: Technical and Editorial Corrections," IEEE Computer Society Sponsored by the LAN/MAN Standards Committee, IEEE 3 Park Avenue New York, NY 10016-5997, Approved Aug. 23, 2013, 128 pages.

3GPP TS 23.501 V15.2.0, "3rd Generation Partnership Project; Technical Specification Group Services and System Aspects; System Architecture for the 5G System; Stage 2 (Release 15)," Jun. 2018, 214 pages.

3GPP TS 23.502 V15.2.0, "3rd Generation Partnership Project; Technical Specification Group Services and System Aspects; Procedures for the 5G System; Stage 2 (Release 15)," Jun. 2018, 308 pages.

3GPP TS 38.401 V15.2.0, "3rd Generation Partnership Project; Technical Specification Group Radio Access Network; NG-RAN; Architecture description (Release 15)," Jun. 6, 2018, 39 pages.

Huawei, et al., "Solution for QoS Monitoring for URLLC Services," SA WG2 Meeting #128,S2-186945, Jul. 2-6, 2018, Vilnius, Lithuania, 4 pages.

Hong, D., et al., "A Segment-based Protection Scheme for MPLS Network Survivability," 2006 IEEE/IFIP Network Operations and Management Symposium NOMS, 2006, 4 pages.

Zhang, L, et al., "Test and Analysis of Piecewise Delay in Wide Area Measurement System," Automation of Electric Power Systems, vol. 40, No. 6, Mar. 25, 2016, with an English abstract, 6 pages.

Huawei, et al., Solution for QoS Monitoring for URLLC Services [online], 3GPP TSG SA WG2 #128, S2-187477, Jul. 2-6, 2018, 12 pages.

Huawei et al., "Transmission with configured grant in NR unlicensed band", 3GPP TSG RAN WG1 Meeting #94 R1-1808064, Gothenburg, Sweden, Aug. 20-24, 2018, 7 Pages.

* cited by examiner

QUALITY OF SERVICE MONITORING METHOD AND SYSTEM, AND DEVICE

CROSS-REFERENCE TO RELATED APPLICATIONS

This application is a continuation of International Patent Application No. PCT/CN2019/100242, filed on Aug. 12, 2019, which claims priority to Chinese Patent Application No. 201810918390.9, filed on Aug. 13, 2018 and Chinese Patent Application No. 201910028864.7, filed on Jan. 11, 2019. The disclosures of the aforementioned applications are hereby incorporated by reference in their entireties.

TECHNICAL FIELD

This application relates to the field of communications technologies, and in particular, to a quality of service (QoS) monitoring method and system, and a device.

BACKGROUND

To address challenges from wireless broadband technologies and keep the leading edge of a 3rd Generation Partnership Project (3GPP) network, the 3GPP standardization organization formulates, at the end of 2016, a next generation mobile communications system (next generation system), which is referred to as a 5th generation (5G) network architecture.

In the 5G network architecture, ultra-reliable low-latency communications (URLLC) scenarios are defined, mainly including services such as unmanned driving and industrial automation that require low-latency and high-reliability connections. An advanced air interface technology and an optimized core network architecture in a 5G network make it possible to fulfill requirements of the foregoing scenarios. However, instability exists in both a bottom-layer link and an upper-layer routing protocol to some extent in the 5G network. In addition, from the perspective of network construction, a delay, an error, or even a network fault is inevitable, but most of the foregoing scenarios relate to services concerning people's lives or production security, and has no tolerance for errors. Therefore, when the 5G network is used to serve industries concerning people's lives or production security, real-time quality of service monitoring needs to be provided by the 5G network. When quality of service does not meet a preset condition, a corresponding adjustment or protective measure may be taken, to select a link that can meet a service requirement of a user.

Currently, a manner of monitoring information about each segment transmission delay is proposed in other approaches, for example, monitoring information about a transmission delay between a terminal and an access device, monitoring information about a transmission delay between the access device and a user plane network element, monitoring information about a transmission delay between the terminal and the user plane network element. It is desired to simplify a method for monitoring segment transmission delay information, such that information about a plurality of segment transmission delays can be obtained in one procedure of monitoring segment transmission delay information. However, currently there is no related solution.

SUMMARY

Embodiments of this application provide a quality of service monitoring method and system, and a device, such that information about a plurality of segment transmission delays can be obtained in one procedure of monitoring segment transmission delay information.

To achieve the foregoing objective, the following technical solutions are used in the embodiments of this application.

According to a first aspect, a quality of service monitoring method is provided, including: obtaining, by a first device, information about a first transmission delay for packet transmission between the first device and a second device for a terminal; and sending, by the first device, the information about the first transmission delay to a third device; and sending, by the first device at a first moment, information related to the first moment to the third device, where the information about the first transmission delay and the information related to the first moment are used to determine information about a second transmission delay for packet transmission between the second device and the third device for the terminal. According to the quality of service monitoring method provided in this embodiment of this application, when monitoring information about a third transmission delay for packet transmission between the first device and the third device for the terminal, the third device may receive, from the first device, the information related to the first moment and the information about the first transmission delay for packet transmission between the first device and the second device for the terminal. In addition, the third device may determine, based on the information about the first transmission delay and the information related to the first moment, the information about the second transmission delay for packet transmission between the second device and the third device for the terminal. In other words, the third device may learn of the information about the first transmission delay, the information about the second transmission delay, and the information about the third transmission delay in one procedure of monitoring segment transmission delay information. Therefore, according to the quality of service monitoring method provided in this embodiment of this application, information about a plurality of segment transmission delays can be obtained in one procedure of monitoring segment transmission delay information. This simplifies an existing method for monitoring segment transmission delay information.

In a possible design, the method further includes: receiving, by the first device, a first message from the third device at a second moment, where the first message requests to monitor the second transmission delay, and the information related to the first moment includes the first moment and the second moment, or a difference between the first moment and the second moment. In other words, in this embodiment of this application, the third device may initiate a second transmission delay monitoring procedure.

In a possible design, the first message further includes a first monitoring granularity corresponding to the second transmission delay. For example, an Internet Protocol (IP) address of a terminal/an IP address corresponding to a General Packet Radio System (GPRS) Tunneling Protocol (GTP) for a user plane (GTP-U) tunnel of a terminal indicates that the first monitoring granularity is a device granularity. An IP address of a terminal/an IP address corresponding to a GTP-U tunnel of a terminal, and a tunnel endpoint identifier (TEID) of the terminal indicate that the first monitoring granularity is a session granularity. An IP address of a terminal/an IP address corresponding to a GTP-U tunnel of a terminal, a TEID of the terminal, and a quality of service (QoS) flow identifier (QFI) of the terminal indicate that the first monitoring granularity is a flow granularity.

In a possible design, the first message further includes at least one of first indication information or a first segment identifier, the first indication information indicates to obtain the information about the first transmission delay, and the first segment identifier identifies a segment corresponding to the first transmission delay. In other words, in this embodiment of this application, the third device may indicate to the first device to obtain the information about the first transmission delay.

In a possible design, the first message further includes a second monitoring granularity corresponding to the first transmission delay. For related descriptions of the second monitoring granularity, refer to those of the first monitoring granularity. Details are not described herein again.

In a possible design, the method further includes: receiving, by the first device, a second message from the third device at a third moment, where the second message requests to monitor a third transmission delay for packet transmission between the first device and the third device for the terminal, and the information related to the first moment includes the first moment and the third moment, or a difference between the first moment and the third moment. In other words, in this embodiment of this application, the third device may initiate a third transmission delay monitoring procedure.

In a possible design, the second message further includes a third monitoring granularity corresponding to the third transmission delay. For related descriptions of the third monitoring granularity, refer to those of the first monitoring granularity. Details are not described herein again.

In a possible design, the second message further includes at least one of second indication information or a second segment identifier, the second indication information indicates to obtain the information about the first transmission delay, and the second segment identifier identifies a segment corresponding to the first transmission delay. In other words, in this embodiment of this application, the third device may indicate to the first device to obtain the information about the first transmission delay.

In a possible design, the second message further includes a fourth monitoring granularity corresponding to the first transmission delay. For related descriptions of the fourth monitoring granularity, refer to those of the first monitoring granularity. Details are not described herein again.

In a possible design, the sending, by the first device, the information about the first transmission delay to a third device, and sending, by the first device at a first moment, information related to the first moment to the third device includes: sending, by the first device, a third message to the third device at the first moment, where the third message includes the information about the first transmission delay and the information related to the first moment. In other words, in this embodiment of this application, both the information about the first transmission delay and the information related to the first moment may be sent to the third device using the third message.

In a possible design, the sending, by the first device, the information about the first transmission delay to a third device, and sending, by the first device at a first moment, information related to the first moment to the third device includes: sending, by the first device, a fourth message to the third device, where the fourth message includes the information about the first transmission delay; and sending, by the first device, a fifth message to the third device at the first moment, where the fifth message includes the information related to the first moment. In other words, in this embodiment of this application, different messages are used to send the information about the first transmission delay and the information related to the first moment to the third device.

In a possible design, the method further includes: receiving, by the first device, a to-be-monitored quality of service parameter from a session management network element, where the to-be-monitored quality of service parameter includes the first transmission delay. Additionally, the obtaining, by a first device, information about a first transmission delay for packet transmission between the first device and a second device for a terminal includes: obtaining, by the first device, the information about the first transmission delay based on the to-be-monitored quality of service parameter. In other words, in this embodiment of this application, the session management network element may activate a quality of service monitoring procedure of the first device.

In a possible design, the method further includes: receiving, by the first device, third indication information from the session management network element, where the third indication information indicates to the first device to send, after detecting the information about the first transmission delay, the information about the first transmission delay to the third device. Based on this solution, after detecting the information about the first transmission delay, the first device may send the information about the first transmission delay to the third device, and then the third device may determine the information about the first transmission delay based on the information about the first transmission delay and the information about the third transmission delay that is obtained through measurement.

In a possible design, the method further includes receiving, by the first device from the session management network element, an event for reporting a monitoring report, where the event includes: the information about the first transmission delay exceeds a preset threshold; the terminal enters an idle mode or a session is released; or periodic reporting is performed. In other words, in this embodiment of this application, the first device may be activated by the session management network element to report the monitoring report to the session management network element.

In a possible design, the method further includes: receiving, by the first device from the session management network element, a length of a monitoring packet used for quality of service monitoring. For example, in this embodiment of this application, the length of the monitoring packet used for quality of service monitoring may be equal to a typical packet length of a valid service data packet. This is not specifically limited in this embodiment of this application.

According to a second aspect, a service monitoring method is provided, including: receiving, by a third device from a first device, information about a first transmission delay for packet transmission between the first device and a second device for a terminal; receiving, by the third device, information related to a first moment from the first device; and determining, by the third device based on the information about the first transmission delay and the information related to the first moment, information about a second transmission delay for packet transmission between the second device and the third device for the terminal. According to the quality of service monitoring method provided in this embodiment of this application, when monitoring information about a third transmission delay for packet transmission between the first device and the third device for the terminal, the third device may receive, from the first device, the information related to the first moment and the information about the first transmission delay for packet transmission between the first device and the second device for the terminal. In addition, the third device may determine, based on the information about the first transmission delay and the information related to the first moment, the information about the second transmission delay for packet transmission between the second device and the third device for the terminal. In other words, the third device may learn of the information about the first transmission delay, the information about the second transmission delay, and the information about the third transmission delay in one procedure of monitoring segment transmission delay information. Therefore, according to the quality of service monitoring method provided in this embodiment of this application, information about a plurality of segment transmission delays can be obtained in one procedure of monitoring segment transmission delay information. This simplifies an existing method for monitoring segment transmission delay information.

In a possible design, the method further includes: sending, by the third device, a first message to the first device, where the first message requests to obtain the information about the second transmission delay. Additionally, the information related to the first moment includes the first moment and a second moment, or a difference between the first moment and the second moment, where the second moment is a moment at which the first device receives the first message. In other words, in this embodiment of this application, the third device may initiate a second transmission delay monitoring procedure.

In a possible design, the first message further includes a first monitoring granularity corresponding to the second transmission delay. For related descriptions of the first monitoring granularity, refer to the descriptions in the first aspect. Details are not described herein again.

In a possible design, the first message further includes at least one of first indication information or a first segment identifier, the first indication information indicates to obtain the information about the first transmission delay, and the first segment identifier identifies a segment corresponding to the information about the first transmission delay. In other words, in this embodiment of this application, the third device may indicate to the first device to obtain the information about the first transmission delay.

In a possible design, the first message further includes a second monitoring granularity corresponding to the first transmission delay. For related descriptions of the second monitoring granularity, refer to those of the first monitoring granularity. Details are not described herein again.

In a possible design, the method further includes: sending, by the third device, a second message to the first device, where the second message requests to obtain information about a third transmission delay for packet transmission between the first device and the third device for the terminal. Additionally, the information related to the first moment includes the first moment and a third moment, or a difference between the first moment and the third moment, where the third moment is a moment at which the first device receives the second message. In other words, in this embodiment of this application, the third device may initiate a third transmission delay monitoring procedure.

In a possible design, the second message further includes a third monitoring granularity corresponding to the third transmission delay. For related descriptions of the third monitoring granularity, refer to those of the first monitoring granularity. Details are not described herein again.

In a possible design, the second message further includes at least one of second indication information or a second segment identifier, the second indication information indicates to obtain the information about the first transmission delay, and the second segment identifier identifies a segment corresponding to the information about the first transmission delay. In other words, in this embodiment of this application, the third device may indicate to the first device to obtain the information about the first transmission delay.

In a possible design, the second message further includes a fourth monitoring granularity corresponding to the first transmission delay. For related descriptions of the fourth monitoring granularity, refer to those of the first monitoring granularity. Details are not described herein again.

In a possible design, the receiving, by a third device from a first device, information about a first transmission delay for packet transmission between the first device and a second device for a terminal, and receiving, by the third device, the information related to the first moment from the first device includes: receiving, by the third device, a third message from the first device, where the third message includes the information about the first transmission delay and the information related to the first moment. In other words, in this embodiment of this application, both the information about the first transmission delay and the information related to the first moment may be sent to the third device using the third message.

In a possible design, the receiving, by a third device from a first device, information about a first transmission delay for packet transmission between the first device and a second device for a terminal, and receiving, by the third device, the information related to the first moment from the first device includes: receiving, by the third device, a fourth message from the first device, where the fourth message includes the information about the first transmission delay; and receiving, by the third device, a fifth message from the first device, where the fifth message includes the information related to the first moment. In other words, in this embodiment of this application, different messages are used to send the information about the first transmission delay and the information related to the first moment to the third device.

According to a third aspect, a quality of service monitoring activation method is provided, where the quality of service monitoring activation method includes: receiving, by a session management network element, quality of service monitoring policies from a policy control network element; determining, by the session management network element, a first quality of service monitoring policy corresponding to a first device from the one or more quality of service monitoring policies; and sending, by the session management network element, the first quality of service monitoring policy to the first device. According to the quality of service monitoring activation method provided in this embodiment of this application, a required quality of service monitoring policy may be provided to a corresponding device in a quality of service monitoring process. Therefore, the device may be activated to initiate a quality of service monitoring procedure or may be activated to report a monitoring report to the session management network element.

In a possible design, the first quality of service monitoring policy includes at least one of a to-be-monitored first quality of service parameter corresponding to the first device or an event in which the first device reports a monitoring report to the session management network element.

In a possible design, the first quality of service monitoring policy further includes a monitoring period that is used for quality of service monitoring and that corresponds to the first device.

In a possible design, the event includes: the first quality of service parameter exceeds a preset threshold; a terminal enters an idle mode or a session is released; or periodic reporting is performed.

In a possible design, the to-be-monitored first quality of service parameter includes at least one of a guaranteed flow bit rate (GFBR), an uplink/downlink maximum flow bit rate (MFBR), data burst volume within a packet delay budget at an access point, a frame error rate (FER), a segment transmission delay, or packet loss information. For example, the segment transmission delay may be a one-way transmission delay or a two way transmission delay.

In a possible design, when the to-be-monitored first quality of service parameter includes a segment transmission delay, the segment transmission delay is a first transmission delay for packet transmission between the first device and a second device for a terminal.

In a possible design, the method further includes: sending, by the session management network element, third indication information to the first device, where the third indication information indicates to the first device to send, after detecting information about the first transmission delay, the information about the first transmission delay to a third device. Based on this solution, after detecting the information about the first transmission delay, the first device may send the information about the first transmission delay to the third device, and then the third device may determine the information about the first transmission delay based on the information about the first transmission delay and information about a third transmission delay that is obtained through measurement.

In a possible design, the first quality of service monitoring policy further includes a length of a monitoring packet used for quality of service monitoring. For related descriptions of the length of the monitoring packet, refer to the descriptions in the first aspect. Details are not described herein again.

In a possible design, the quality of service monitoring policy includes information about the first device. Additionally, the determining, by the session management network element, a first quality of service monitoring policy corresponding to a first device from the one or more quality of service monitoring policies includes: determining, by the session management network element, the first quality of service monitoring policy from the one or more quality of service monitoring policies based on the information about the first device. Based on the solution, the session management network element may determine the first quality of service monitoring policy corresponding to the first device from the one or more quality of service monitoring policies.

In a possible design, the first quality of service monitoring policy includes the to-be-monitored first quality of service parameter corresponding to the first device. Additionally, the determining, by the session management network element, a first quality of service monitoring policy corresponding to a first device from the one or more quality of service monitoring policies includes: determining, by the session management network element based on a parameter type of the first quality of service parameter, the to-be-monitored first quality of service parameter corresponding to the first device. Based on the solution, the session management network element may determine the first quality of service monitoring policy corresponding to the first device from the one or more quality of service monitoring policies.

With reference to the first aspect, the second aspect, or the third aspect, in a possible design, the first device is an access device, the second device is a terminal, and the third device is a user plane network element; or the first device is an access device, the second device is a user plane network element, and the third device is a terminal; or the first device is a terminal, the second device is an access device, and the third device is a user plane network element; or the first device is a user plane network element, the second device is an access device, and the third device is a terminal.

According to a fourth aspect, a first device is provided, where the sending device has a function of implementing the method in the first aspect. The function may be implemented by hardware, or may be implemented by hardware executing corresponding software. The hardware or the software includes one or more modules corresponding to the foregoing functions.

According to a fifth aspect, a first device is provided, including a processor and a memory. The memory is configured to store a computer-executable instruction, and when the first device runs, the processor executes the computer-executable instruction stored in the memory, such that the first device performs the quality of service monitoring method in any design of the first aspect.

According to a sixth aspect, a first device is provided, including a processor. The processor is configured to be coupled to a memory, read an instruction in the memory, and perform the quality of service monitoring method in any design of the first aspect according to the instruction.

According to a seventh aspect, a computer-readable storage medium is provided. The computer-readable storage medium stores an instruction, and when the instruction is run on a computer, the computer is enabled to perform the quality of service monitoring method in any design of the first aspect.

According to an eighth aspect, a computer program product including an instruction is provided. When the computer program product is run on a computer, the computer is enabled to perform the quality of service monitoring method in any design of the first aspect.

According to a ninth aspect, an apparatus (for example, the apparatus may be a chip system) is provided. The apparatus includes a processor, configured to support a first device in implementing the functions in the first aspect, for example, obtaining information about a first transmission delay for packet transmission between the first device and a second device for a terminal. In a possible design, the apparatus may further include a memory. The memory is configured to store a program instruction and data that are necessary for the first device. When the apparatus is a chip system, the apparatus may include a chip, or may include a chip and another discrete device.

For a technical effect brought by any design of the fourth aspect to the ninth aspect, refer to technical effects brought by different designs of the first aspect. Details are not described herein again.

According to a tenth aspect, a third device is provided, where the third device has a function of implementing the method in the second aspect. The function may be implemented by hardware, or may be implemented by hardware executing corresponding software. The hardware or the software includes one or more modules corresponding to the foregoing functions.

According to an eleventh aspect, a third device is provided, including a processor and a memory. The memory is configured to store a computer-executable instruction, and when the third device runs, the processor executes the computer-executable instruction stored in the memory, such that the third device performs the quality of service monitoring method in any design of the second aspect.

According to a twelfth aspect, a third device is provided, including a processor. The processor is configured to be coupled to a memory, read an instruction in the memory, and perform the quality of service monitoring method in any design of the second aspect according to the instruction.

According to a thirteenth aspect, a computer-readable storage medium is provided. The computer-readable storage medium stores an instruction, and when the instruction is run on a computer, the computer is enabled to perform the quality of service monitoring method in any design of the second aspect.

According to a fourteenth aspect, a computer program product including an instruction is provided. When the computer program product is run on a computer, the computer is enabled to perform the quality of service monitoring method in any design of the second aspect.

According to a fifteenth aspect, an apparatus (for example, the apparatus may be a chip system) is provided. The apparatus includes a processor, configured to support a third device in implementing the functions in the second aspect, for example, obtaining information about a first transmission delay for packet transmission between the third device and a second device for the terminal. In a possible design, the apparatus may further include a memory. The memory is configured to store a program instruction and data that are necessary for the third device. When the apparatus is a chip system, the apparatus may include a chip, or may include a chip and another discrete device.

For a technical effect brought by any design of the tenth aspect to the fifteenth aspect, refer to technical effects brought by different designs of the second aspect. Details are not described herein again.

According to a sixteenth aspect, a session management network element is provided, where the session management network element has a function of implementing the method in the third aspect. The function may be implemented by hardware, or may be implemented by hardware executing corresponding software. The hardware or the software includes one or more modules corresponding to the foregoing functions.

According to a seventeenth aspect, a session management network element is provided, including a processor and a memory. The memory is configured to store a computer-executable instruction, and when the session management network element runs, the processor executes the computer-executable instruction stored in the memory, such that the session management network element performs the quality of service monitoring activation method in any design of the third aspect.

According to an eighteenth aspect, a session management network element is provided, including a processor. The processor is configured to be coupled to a memory, read an instruction in the memory, and perform the quality of service monitoring activation method in any design of the third aspect according to the instruction.

According to a nineteenth aspect, a computer-readable storage medium is provided. The computer-readable storage medium stores an instruction, and when the instruction is run on a computer, the computer is enabled to perform the quality of service monitoring activation method in any design of the third aspect.

According to a twentieth aspect, a computer program product including an instruction is provided. When the computer program product is run on a computer, the computer is enabled to perform the quality of service monitoring activation method in any design of the third aspect.

According to a twenty-first aspect, an apparatus (for example, the apparatus may be a chip system) is provided. The apparatus includes a processor, configured to support a session management network element in implementing the functions in the third aspect, for example, determining a first quality of service monitoring policy corresponding to a first device from a quality of service monitoring policy. In a possible design, the apparatus further includes a memory. The memory is configured to store a program instruction and data that are necessary for the session management network element. When the apparatus is a chip system, the apparatus may include a chip, or may include a chip and another discrete device.

For a technical effect brought by any design of the sixteenth aspect to the twenty-first aspect, refer to technical effects brought by different designs of the third aspect. Details are not described herein again.

According to a twenty-second aspect, a quality of service monitoring system is provided, where the quality of service monitoring system includes the first device and the third device in any one of the foregoing aspects.

According to a twenty-third aspect, a quality of service monitoring method is provided, including: receiving, by a terminal, information related to a first moment from an access device, where the first moment is a moment at which the access device receives a first packet sent by the terminal, or a moment at which the access device sends a second packet to the terminal; and determining, by the terminal based on the information related to the first moment, information about a transmission delay for packet transmission between the terminal and the access device. Based on the solution, the terminal may determine the information about the transmission delay for packet transmission between the terminal and the access device for the terminal.

In a possible design, when the first moment is the moment at which the access device receives the first packet sent by the terminal, the determining, by the terminal based on the information related to the first moment, information about a transmission delay for packet transmission between the terminal and the access device for the terminal includes: determining, by the terminal based on the information related to the first moment, information about an uplink delay corresponding to the first packet when the first packet is transmitted between the terminal and the access device. Based on the solution, the terminal may determine information about an uplink delay for packet transmission between the terminal and the access device for the terminal.

In a possible design, the information related to the first moment includes the first moment, or a difference between the first moment and a second moment, where the second moment is a moment at which the terminal sends the first packet to the access device.

In a possible design, before the receiving, by a terminal, information related to a first moment from an access device, the method further includes: sending, by the terminal, the first packet to the access device at the second moment, where the first packet carries first indication information, and the first indication information indicates that the first packet is used for delay monitoring.

In a possible design, when the first moment is the moment at which the access device sends the second packet to the terminal, the determining, by the terminal based on the information related to the first moment, information about a transmission delay for packet transmission between the terminal and the access device for the terminal includes: determining, by the terminal based on the information related to the first moment, information about a downlink delay corresponding to the second packet when the second packet is transmitted between the terminal and the access device. Based on the solution, the terminal may determine information about an uplink delay for packet transmission between the terminal and the access device for the terminal.

In a possible design, the information related to the first moment includes the first moment, or a difference between the first moment and a third moment, where the third moment is a moment at which the terminal receives the second packet sent by the access device.

In a possible design, the information related to the first moment includes the difference between the first moment and the third moment, and before the receiving, by a terminal, information related to a first moment from an access device, the method further includes: receiving, by the terminal, the second packet from the access device; and sending, by the terminal to the access device, information indicating the third moment, where the third moment is the moment at which the terminal receives the second packet sent by the access device. Based on the solution, the terminal may learn of the moment at which the terminal receives the second packet sent by the access device, and then may determine information about a downlink delay for packet transmission between the terminal and the access device for the terminal.

In a possible design, the receiving, by a terminal, information related to a first moment from an access device includes: receiving, by the terminal, the second packet from the access device, where the second packet carries the first moment. In other words, in this embodiment of this application, the access device may send the information related to the first moment to the terminal using a downlink packet.

In a possible design, after the determining, by the terminal, information about a downlink delay corresponding to the second packet when the second packet is transmitted between the terminal and the access device, the method further includes: sending, by the terminal, the information about the downlink delay to the access device. Based on the solution, the access device may learn of the information about the downlink delay for packet transmission between the terminal and the access device for the terminal.

In a possible design, the second packet carries second indication information, and the second indication information indicates that the second packet is used for delay monitoring.

In a possible design, the receiving, by a terminal, information related to a first moment from an access device includes: receiving, by the terminal, a third packet from the access device, where the third packet carries the information related to the first moment. In other words, in this embodiment of this application, the access device may send the information related to the first moment to the terminal using a downlink packet.

In a possible design, the terminal receives Radio Resource Control (RRC) signaling from the access device, where the RRC signaling carries the information related to the first moment. In other words, in this embodiment of this application, the access device may send the information related to the first moment to the terminal using the RRC signaling.

According to a twenty-fourth aspect, a quality of service monitoring method is provided, including: obtaining, by an access device, information about a first transmission delay for packet transmission between the access device and a terminal for the terminal; obtaining, by the access device, information about a second transmission delay for packet transmission between the access device and a user plane network element for the terminal; and sending, by the access device, the information about the first transmission delay and the information about the second transmission delay to a control plane network element. Based on this solution, in a transmission delay monitoring process, as an intermediate device, the access device can directly obtain information about transmission delays between the access device and devices between the access device and devices on two sides of the access device of the access device, and then report the delays. This avoids a case in which a device on each of the two sides can report a segment transmission delay or an end-to-end transmission delay only after obtaining a delay of a segment in which the device is not located, thereby simplifying a delay monitoring mechanism.

In a possible design, the obtaining, by an access device, information about a first transmission delay for packet transmission between the access device and a terminal for the terminal includes: obtaining, by the access device, information related to a first moment, where the first moment is a moment at which the access device receives a first packet sent by the terminal, or a moment at which the access device sends a second packet to the terminal; and determining, by the access device based on the information related to the first moment, information about a transmission delay for packet transmission between the terminal and the access device for the terminal. Based on the solution, the access device may obtain the information about the transmission delay for packet transmission between the terminal and the access device for the terminal.

According to a twenty-fifth aspect, a communications apparatus is provided, configured to implement the foregoing methods. The communications apparatus may be the terminal in the twenty-third aspect, or an apparatus including the terminal. Alternatively, the communications apparatus may be the access device in the twenty-fourth aspect, or an apparatus including the access device. The communications apparatus includes a corresponding module, unit, or means for implementing the foregoing method. The module, unit, or means may be implemented by hardware or software, or implemented by hardware executing corresponding software. The hardware or the software includes one or more modules or units corresponding to the foregoing functions.

According to a twenty-sixth aspect, a communications apparatus is provided, including a processor and a memory. The memory is configured to store a computer instruction, and when the processor executes the instruction, the communications apparatus is enabled to perform the method according to any one of the foregoing aspects. The communications apparatus may be the terminal in the twenty-third aspect, or an apparatus including the terminal. Alternatively, the communications apparatus may be the access device in the twenty-fourth aspect, or an apparatus including the access device.

According to a twenty-seventh aspect, a communications apparatus is provided, including a processor. The processor is configured to be coupled to a memory, read an instruction in the memory, and perform the method in any one of the foregoing aspects according to the instruction. The communications apparatus may be the terminal in the twenty-third aspect, or an apparatus including the terminal. Alternatively, the communications apparatus may be the access device in the twenty-fourth aspect, or an apparatus including the access device.

According to a twenty-eighth aspect, a computer-readable storage medium is provided. The computer-readable storage medium stores an instruction, and when the instruction is run on a computer, the computer is enabled to perform the method in any one of the foregoing aspects.

According to a twenty-ninth aspect, a computer program product including an instruction is provided. When the computer program product is run on a computer, the computer may perform the method in any one of the foregoing aspects.

According to a thirtieth aspect, a communications apparatus (for example, the communications apparatus may be a chip or a chip system) is provided. The communications apparatus includes a processor, configured to implement the function in any one of the foregoing aspects. In a possible design, the communications apparatus further includes a memory. The memory is configured to store a necessary program instruction and necessary data. When the communications apparatus is a chip system, the apparatus may include a chip, or may include a chip and another discrete device.

For a technical effect brought by any design of the twenty-fifth aspect to the thirtieth aspect, refer to technical effects brought by different designs of the twenty-third aspect or the twenty-fourth aspect. Details are not described herein again.

These aspects or other aspects of this application are clearer and more comprehensible in descriptions of the following embodiments.

DESCRIPTION OF EMBODIMENTS

The following describes the technical solutions in the embodiments of this application with reference to the accompanying drawings in the embodiments of this application. Unless otherwise specified, "/" in descriptions of this application represents an "or" relationship between associated objects. For example, A/B may represent A or B. The term "and/or" in this application describes only an association relationship of associated objects and represents that three relationships may exist. For example, A and/or B may represent the following three cases: Only A exists, both A and B exist, and only B exists, where A and B may be singular or plural. In addition, unless otherwise specified, "a plurality of" in the descriptions of this application means two or more than two. "At least one (one piece) of the following" or a similar expression thereof refers to any combination of these items, and includes a single item (piece) or any combination of a plurality of items (pieces). For example, at least one (piece) of a, b, or c may represent a, b, c, a combination of a and b, a combination of a and c, a combination of b and c, or a combination of a, b, and c, where a, b, and c each may be in a singular or plural form. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that as network architectures evolve and a new service scenario emerges, the technical solutions provided in the embodiments of this application are also applicable to similar technical problems.

Figure 1:
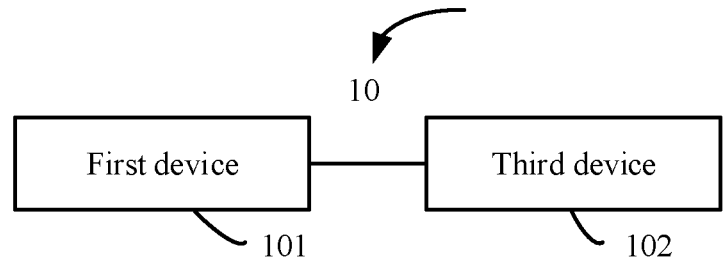
FIG. 1 is a schematic architectural diagram of a quality of service monitoring system according to an embodiment of this application.

FIG. 1 shows a quality of service monitoring system 10 according to an embodiment of this application. The quality of service monitoring system 10 includes a first device 101 and a third device 102.

The first device is configured to: obtain information about a first transmission delay for packet transmission between the first device and a second device for a terminal; send information about the first transmission delay to the third device; and send information related to a first moment to the third device.

The third device is configured to: receive the information about the first transmission delay and the information related to the first moment; and determine, based on the information about the first transmission delay and the information related to the first moment, information about a second transmission delay for packet transmission between the second device and the third device for the terminal.

Optionally, in this embodiment of this application, the first device may be an access device, the second device may be a terminal, and the third device may be a user plane network element.

Alternatively, optionally, in this embodiment of this application, the first device may be an access device, the second device may be a user plane network element, and the third device may be a terminal.

Alternatively, optionally, in this embodiment of this application, the first device may be a terminal, the second device may be an access device, and the third device may be a user plane network element.

Alternatively, optionally, in this embodiment of this application, the first device may be a user plane network element, the second device may be an access device, and the third device may be a terminal.

Optionally, the first device 101 and the second device 102 in this embodiment of this application may directly communicate with each other, or may communicate with each other through forwarding by another device. This is not specifically limited in this embodiment of this application.

According to the quality of service monitoring system provided in this embodiment of this application, when monitoring information about a third transmission delay for packet transmission between the first device and the third device for the terminal, the third device may receive, from the first device, the information related to the first moment and the information about the first transmission delay for packet transmission between the first device and the second device for the terminal. In addition, the third device may determine, based on the information about the first transmission delay and the information related to the first moment, the information about the second transmission delay for packet transmission between the second device and the third device for the terminal. In other words, the third device may learn of the information about the first transmission delay, the information about the second transmission delay, and the information about the third transmission delay in one procedure of monitoring segment transmission delay information. Therefore, according to the quality of service monitoring system provided in this embodiment of this application, information about a plurality of segment transmission delays can be obtained in one procedure of monitoring segment transmission delay information. This simplifies an existing method for monitoring segment transmission delay information.

Figure 2:
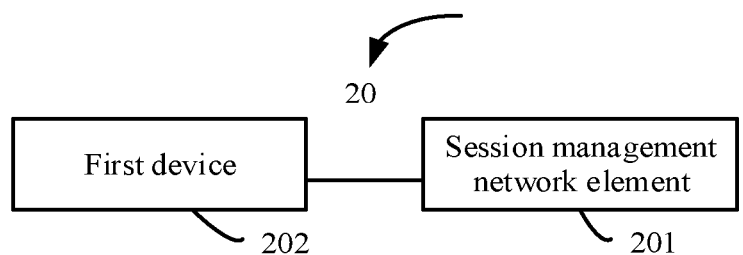
FIG. 2 is a schematic architectural diagram of a quality of service monitoring activation system according to an embodiment of this application.

Optionally, FIG. 2 shows a quality of service monitoring activation system 20 according to an embodiment of this application. The quality of service monitoring activation system 20 includes a session management network element 201 and a first device 202.

The session management network element 201 is configured to: receive one or more quality of service monitoring policies from a policy control network element; determine a first quality of service monitoring policy corresponding to the first device from the one or more quality of service monitoring policies; and send the first quality of service monitoring policy to the first device 202.

The first device 202 is configured to receive the first quality of service monitoring policy from the session management network element 201.

Optionally, when the first quality of service monitoring policy includes a to-be-monitored first quality of service parameter corresponding to the first device 202, the first device 202 may initiate corresponding quality of service monitoring after receiving the first quality of service monitoring policy from the session management network element 201, to obtain information about the first quality of service parameter.

Alternatively, optionally, when the first quality of service monitoring policy includes an event in which the first device 202 reports a monitoring report to the session management network element 201, after receiving the first quality of service monitoring policy from the session management network element 201, the first device 202 may report the monitoring report to the session management network element 201 when a preset condition for the event for reporting a monitoring report is met.

Optionally, in this embodiment of this application, the first device may be an access device, the second device may be a terminal, and the third device may be a user plane network element.

Alternatively, optionally, in this embodiment of this application, the first device may be an access device, the second device may be a user plane network element, and the third device may be a terminal.

Alternatively, optionally, in this embodiment of this application, the first device may be a terminal, the second device may be an access device, and the third device may be a user plane network element.

Alternatively, optionally, in this embodiment of this application, the first device may be a user plane network element, the second device may be an access device, and the third device may be a terminal.

Optionally, the session management network element 201 and the first device 202 in this embodiment of this application may directly communicate with each other, or may communicate with each other through forwarding by another device. This is not specifically limited in this embodiment of this application.

According to the quality of service monitoring activation system provided in this embodiment of this application, a required quality of service monitoring policy may be provided to a corresponding device in a quality of service monitoring process. Therefore, the device may be activated to initiate a quality of service monitoring procedure or the device may be activated to report a monitoring report to the session management network element.

Figure 11:
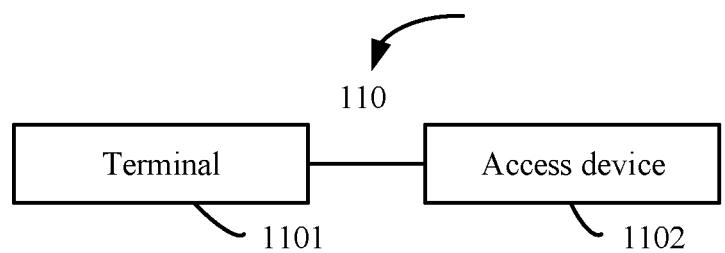
FIG. 11 is a schematic architectural diagram of another quality of service monitoring system according to an embodiment of this application.

Alternatively, optionally, FIG. 11 shows a quality of service monitoring system 110 according to an embodiment of this application. The quality of service monitoring system 110 includes a terminal 1101 and an access device 1102.

The access device 1102 is configured to obtain information related to a first moment, where the first moment is a moment at which the access device 1102 receives a first packet sent by the terminal 1101, or a moment at which the access device 1102 sends a second packet to the terminal 1101.

The terminal 1101 is configured to: receive the information related to the first moment, and determine, based on the information related to the first moment, information about a transmission delay for packet transmission between the terminal 1101 and the access device 1102 for the terminal 1101.

It should be noted that monitoring in the embodiments of this application may alternatively be replaced by detection, and detection in the embodiments of this application may also be replaced by monitoring. In other words, detection and monitoring may be replaced by each other. General description is provided herein, and details are not described below again.

According to the quality of service monitoring systems provided in the embodiments of this application, the terminal may determine information about a transmission delay for packet transmission between the terminal and the access device for the terminal.

Optionally, the quality of service monitoring system 10 in FIG. 1, the quality of service monitoring activation system 20 in FIG. 2, or the quality of service monitoring system 110 in FIG. 11 may be applied to a current 5G network and a future network. This is not specifically limited in the embodiments of this application.

Figure 3:
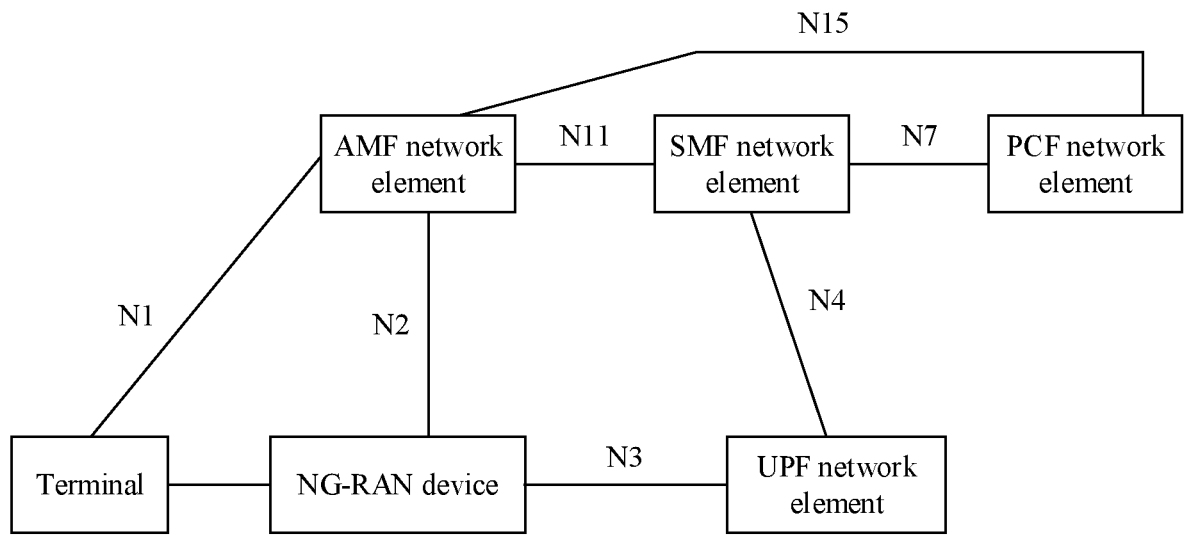
FIG. 3 is a schematic diagram of application of a quality of service monitoring system in a 5G network according to an embodiment of this application.

For example, it is assumed that the quality of service monitoring system 10 in FIG. 1, the quality of service monitoring activation system 20 in FIG. 2, or the quality of service monitoring system 110 in FIG. 11 is applied to the current 5G network. As shown in FIG. 3, a network element or an entity corresponding to the foregoing terminal may be a terminal in the 5G network; a network element or an entity corresponding to the foregoing access device may be an access device in the 5G network; a network element or an entity corresponding to the foregoing user plane network element may be a user plane function (UPF) network element in the 5G network; and a network element or an entity corresponding to the foregoing session management network element may be a session management function (SMF) network element in the 5G network.

In addition, as shown in FIG. 3, the 5G network may further include an access and mobility management function (AMF) network element, a policy control function (PCF) network element, or the like. This is not specifically limited in the embodiments of this application.

The terminal communicates with the AMF network element using a next generation (N) network interface 1 (N1). The access device communicates with the AMF network element using an N interface 2 (N2), and communicates with the UPF network element using an N interface 3 (N3). The AMF network element communicates with the SMF network element using an N interface 11 (N11), and communicates with the PCF network element using an N interface 15 (N15). The SMF network element communicates with the PCF network element using an N interface 7 (N7), and communicates with the UPF network element using an N interface 4 (N4).

It should be noted that, names of interfaces between the network elements in FIG. 3 are merely examples and the interfaces may have other names in other implementations. This is not specifically limited in the embodiments of this application.

In addition, it should be noted that control plane network elements such as the AMF network element, the SMF network element, and the PCF network element in the 5G network shown in FIG. 3 may alternatively interact with each other through a service-based interface. For example, a service-based interface provided by the AMF network element may be an Namf, a service-based interface provided by the SMF network element may be an Nsmf, and a service-based interface provided by the PCF network element may be an Npcf. For related descriptions, refer to a diagram of a 5G system architecture in 3GPP Technical Specification (TS) 23.501 standard. Details are not described herein again.

Optionally, the terminal in the embodiments of this application may include various handheld devices, vehicle-mounted devices, wearable devices, computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, a user equipment (UE), a mobile station (MS), a terminal device, relay user equipment, or the like. The relay user equipment may be, for example, a 5G residential gateway (RG). For ease of description, in this application, the devices mentioned above are collectively referred to as a terminal.

Optionally, the access device in the embodiments of this application is a device that accesses a core network. For example, the access device may be a base station, a broadband network gateway (BNG), an aggregation switch, a non-3rd Generation Partnership Project (non-3GPP) access device, or the like. The base station may include base stations in various forms, for example, a macro base station, a micro base station (also referred to as a small cell), a relay station, or an access point.

Optionally, the first device or the third device in FIG. 1, the session management network element in FIG. 2, or the terminal or the access device in FIG. 11 in the embodiments of this application may be implemented by one device, or may be jointly implemented by a plurality of devices, or may be implemented by a function module in one device. This is not specifically limited in the embodiments of this application. It may be understood that, the foregoing functions may be network elements in a hardware device, or may be software functions running on dedicated hardware, or may be instantiated virtualization functions on a platform (for example, a cloud platform).

Figure 4:
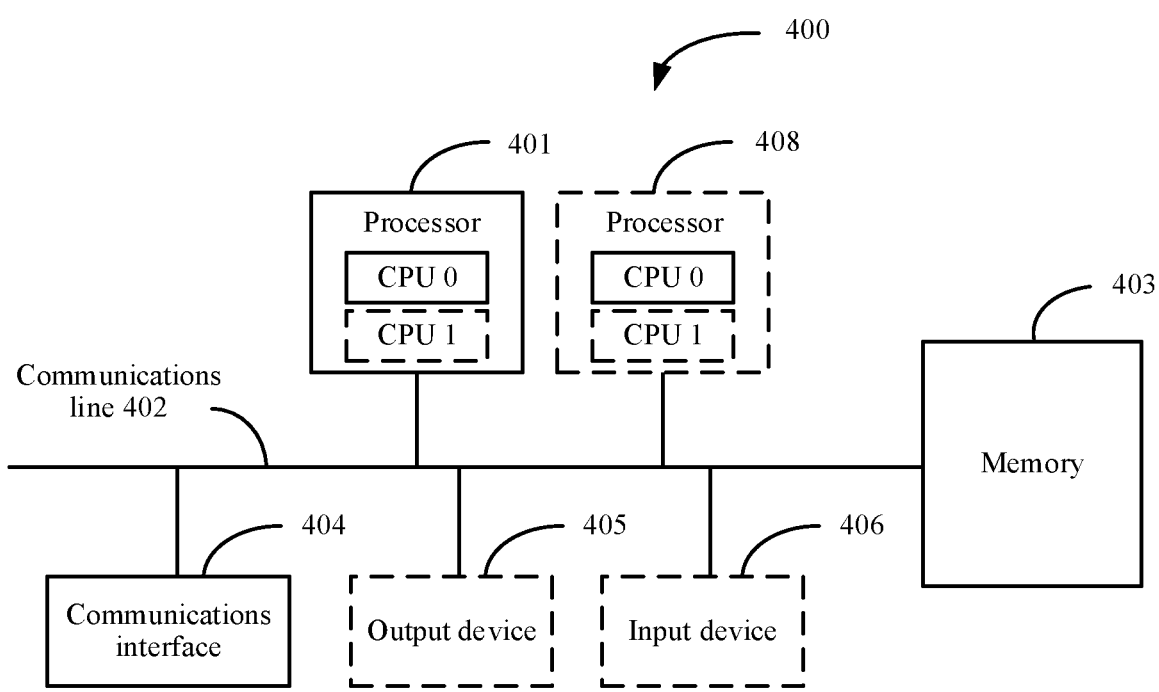
FIG. 4 is a schematic diagram of a hardware structure of a communications device according to an embodiment of this application.

For example, the first device or the third device in FIG. 1, the session management network element in FIG. 2, or the terminal or the access device in FIG. 11 in the embodiments of this application may be implemented by one device, or may be jointly implemented using a communications device in FIG. 4. FIG. 4 is a schematic diagram of a hardware structure of a communications device according to an embodiment of this application. A communications device 400 includes a processor 401, a communications line 402, a memory 403, and at least one communications interface (FIG. 4 is described merely using an example in which the communications device 400 includes a communications interface 404).

The processor 401 may be a general-purpose central processing unit (CPU), a microprocessor, an application-specific integrated circuit (ASIC), or one or more integrated circuits configured to control program execution in the solutions of this application.

The communications line 402 may include a path, to transfer information between the foregoing components.

The communications interface 404 is any apparatus such as a transceiver, and is configured to communicate with another device or a communications network, such as the Ethernet, a radio access network (RAN), or a wireless local area network (WLAN).

The memory 403 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store desired program code in a form of an instruction or a data structure and that can be accessed by a computer. However, the memory 403 is not limited thereto. The memory may exist independently, and is connected to the processor using the communications line 402. The memory may alternatively be integrated into the processor.

The memory 403 is configured to store a computer-executable instruction for executing the solutions of this application, and the processor 401 controls execution of the computer-executable instruction. The processor 401 is configured to execute the computer-executable instruction stored in the memory 403, to implement a quality of service monitoring method provided in the following embodiments of this application.

Optionally, the computer-executable instruction in the embodiments of this application may also be referred to as application program code. This is not specifically limited in the embodiments of this application.

In implementation, in an embodiment, the processor 401 may include one or more CPUs, for example, a CPU 0 and a CPU 1 in FIG. 4.

In implementation, in an embodiment, the communications device 400 may include a plurality of processors, for example, the processor 401 and a processor 408 in FIG. 4. Each of the processors may be a single-core (single-CPU) processor or a multi-core (multi-CPU) processor. The processor herein may be one or more devices, circuits, and/or processing cores for processing data (for example, a computer program instruction).

In implementation, in an embodiment, the communications device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, a projector, or the like. The input device 406 communicates with the processor 401, and may receive user input in a plurality of manners. For example, the input device 406 may be a mouse, a keyboard, a touchscreen device, a sensor device, or the like.

The communications device 400 may be a general-purpose device or a dedicated device. In implementation, the communications device 400 may be a desktop computer, a portable computer, a network server, a palmtop computer (PDA), a mobile phone, a tablet computer, a wireless terminal device, an embedded device, or a device with a structure similar to that in FIG. 4. A type of the communications device 400 is not limited in the embodiments of this application.

The following describes in detail quality of service monitoring methods provided in the embodiments of this application with reference to FIG. 1 to FIG. 4 and FIG. 11.

It should be noted that names of messages between network elements or names of parameters in the messages or the like in the following embodiments of this application are merely examples, and there may be other names in other implementations. This is not specifically limited in the embodiments of this application.

Figure 5A:
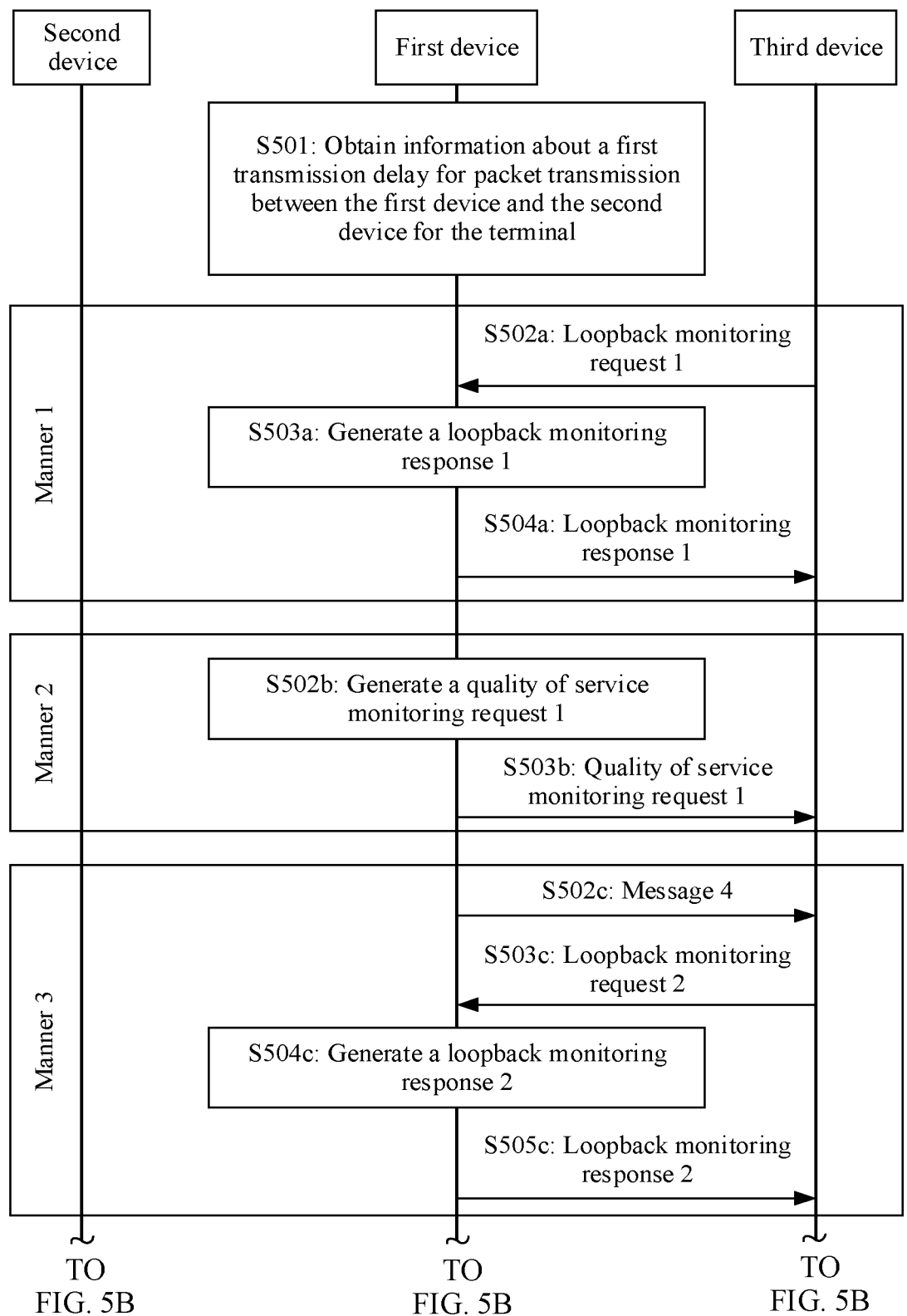
FIG. 5A and FIG. 5B are a first schematic flowchart of a quality of service monitoring method according to an embodiment of this application.
Figure 5B:
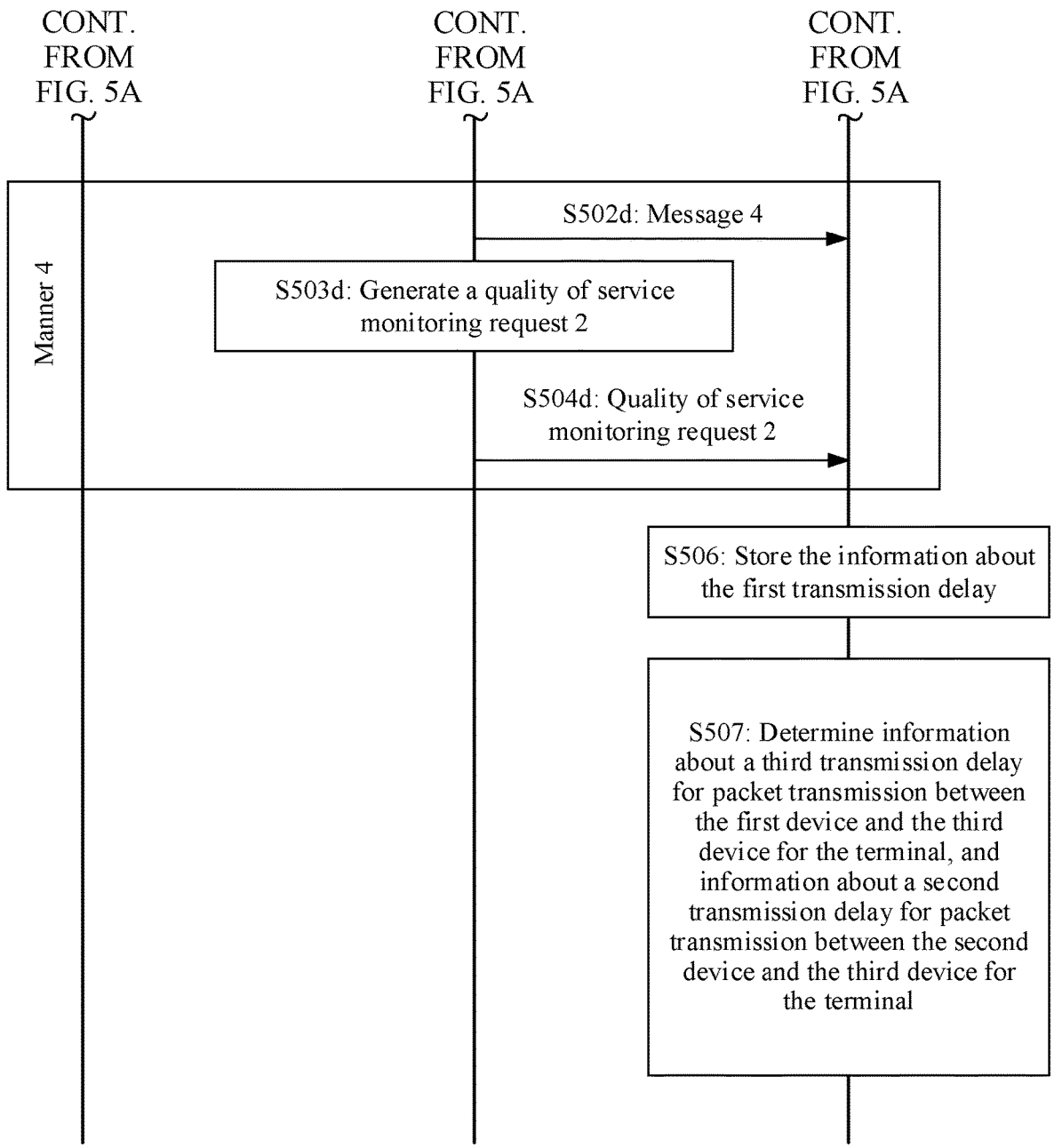

First, for example, the quality of service monitoring system in FIG. 1 is applied to the 5G network shown in FIG. 3; and a first device is an access device, a second device is a terminal, and a third device is a UPF network element; or a first device is an access device, a second device is a UPF network element, and a third device is a terminal. FIG. 5A and FIG. 5B show a quality of service monitoring method according to an embodiment of this application. The quality of service monitoring method includes the following steps.

S501: The first device obtains information about a first transmission delay for packet transmission between the first device and the second device for the terminal.

In this embodiment of this application, the first device may initiate monitoring of the first transmission delay for packet transmission between the first device and the second device, and obtain the information about the first transmission delay. For a manner of monitoring the first transmission delay, refer to an existing implementation. Details are not described herein.

Optionally, the first transmission delay in this embodiment of this application may be an uplink (UL) or downlink (DL) one-way delay for packet transmission between the first device and the second device. Alternatively, the first transmission delay may be a round-trip time (RTT) for packet transmission between the first device and the second device for the terminal. This is not specifically limited in this embodiment of this application.

In this embodiment of this application, in a scenario in which the first device is an access device and the second device is a terminal, the first transmission delay for packet transmission between the first device and the second device for the terminal may alternatively be referred to as an air interface transmission delay or a Uu interface delay. This is not specifically limited in this embodiment of this application.

Optionally, in this embodiment of this application, the third device may obtain information related to a first moment and the information about the first transmission delay in any one of the following manners 1 to 4.

Manner 1: The quality of service monitoring method provided in this embodiment of this application further includes steps S502*a* to S504*a*.

S502*a*: The third device sends a message 1 to the first device, and the first device receives the message 1 from the third device at a moment T2.

For example, as shown in FIG. 5A and FIG. 5B, the message 1 in this embodiment of this application may be, for example, a loopback monitoring request 1. The loopback monitoring request 1 may include one or more monitoring request packets, and each of the monitoring request packets may include a related sequence number (SN). This is not specifically limited in this embodiment of this application.

Optionally, in this embodiment of this application, the message 1 requests to monitor a second transmission delay for packet transmission between the second device and the third device for the terminal. Alternatively, the message 1 requests to monitor a third transmission delay for packet transmission between the first device and the third device for the terminal. This is not specifically limited in this embodiment of this application.

Optionally, in this embodiment of this application, when the message 1 requests to monitor the second transmission delay for packet transmission between the second device and the third device for the terminal, the message 1 may further include a monitoring granularity 1 corresponding to the second transmission delay. For example, an Internet Protocol (IP) address of the terminal/an IP address corresponding to a general packet radio system (GPRS) tunneling protocol for a user plane (GTP-U) tunnel of the terminal indicates that the monitoring granularity 1 is a device granularity. An IP address of the terminal/an IP address corresponding to a GTP-U tunnel of the terminal, and a tunnel endpoint identifier (TEID) of the terminal indicate that the monitoring granularity 1 is a session granularity. An IP address of a terminal/an IP address corresponding to a GTP-U tunnel of the terminal, a TEID of the terminal, and a quality of service (QoS) flow identifier (QFI) of the terminal indicate that the monitoring granularity 1 is a flow granularity. This is not specifically limited in this embodiment of this application.

Optionally, in this embodiment of this application, when the message 1 requests to monitor the third transmission delay for packet transmission between the first device and the third device for the terminal, the message 1 may further include a monitoring granularity 3 corresponding to the third transmission delay. For related descriptions of the monitoring granularity 3, refer to those of the monitoring granularity 1. Details are not described herein again.

Optionally, in this embodiment of this application, the message 1 may further include at least one of indication information 1 or a segment identifier 1. The indication information 1 indicates to obtain the information about the first transmission delay, and the segment identifier 1 identifies a segment corresponding to the first transmission delay. This is not specifically limited in this embodiment of this application.

Optionally, in this embodiment of this application, the message 1 may further include a monitoring granularity 2 corresponding to the first transmission delay. For related descriptions of the monitoring granularity 2, refer to those of the monitoring granularity 1. Details are not described herein again.

In conclusion, in this embodiment of this application, the message 1 may indicate the following four cases.

a. Information about a to-be-monitored segment is not indicated, for example, information about a segment corresponding to the second transmission delay or information about a segment corresponding to the third transmission delay; and information about a segment that the third device requests to obtain is not indicated either, for example, information about a segment corresponding to the first transmission delay. In other words, after receiving the message 1 from the third device, the first device returns, by default or according to a local policy on the first device, a response message corresponding to the message 1.

b. Information about a to-be-monitored segment is not indicated, for example, information about a segment corresponding to the second transmission delay or information about a segment corresponding to the third transmission delay; but information about a segment that the third device requests to obtain is indicated. If the segment identifier 1 corresponding to the first transmission delay is configured on the first device and the third device, the third device may add the segment identifier 1 to the message 1, to request to obtain information about the first transmission delay corresponding to the segment identifier 1.

c. Information about a to-be-monitored segment is indicated, but information about a segment that the third device requests to obtain is not indicated. If a segment identifier 2 corresponding to the second transmission delay and/or a segment identifier 3 corresponding to the third transmission delay are/is configured on each of the first device and the third device, the third device may add the segment identifier 2 to the message 1 to request to monitor information about the second transmission delay corresponding to the segment identifier 2, or may add the segment identifier 3 to the message 1 to request to monitor information about the second transmission delay corresponding to the segment identifier 3.

d. Information about a to-be-monitored segment is indicated, and information about a segment that the third device requests to obtain is also indicated. Refer to the foregoing case c for a manner of indicating information about a to-be-monitored segment. Refer to the foregoing case b for a manner of indicating information requested to be obtained. Details are not described herein again.

Optionally, in this embodiment of this application, there is no necessary sequence for performing steps S501 and S502a. Step S501 may be performed before step S502a.

Alternatively, step S502a may be performed before step S501. For example, after receiving the loopback monitoring request 1 from the third device, the first device initiates the monitoring of the first transmission delay for packet transmission between the first device and the second device for the terminal. Alternatively, steps S501 and S502a may be simultaneously performed. This is not specifically limited in this embodiment of this application.

S503a. The first device generates a message 2 corresponding to the message 1.

For example, as shown in FIG. 5A and FIG. 5B, the message 2 in this embodiment of this application may be, for example, a loopback monitoring response 1. The loopback monitoring response 1 may include one or more measurement response packets (measurement response packet), and each of the measurement request packets may include a related sequence number. This is not specifically limited in this embodiment of this application.

In this embodiment of this application, the monitoring request packet in step S502a and the measurement response packet in step S503a may be collectively referred to as a monitoring packet. General description is provided herein, and details are not described below again.

In this embodiment of this application, after receiving the message 1, the first device may generate or construct the message 2 corresponding to the message 1. For example, the first device may add the information about the first transmission delay and the information related to the first moment to the message 2. The information related to the first moment may include, for example, the moment T2 at which the first device receives the message 1 and a moment T5 at which the first device sends the message 2. Alternatively, the information related to the first moment may include, for example, a difference between a moment T5 at which the first device sends the message 2 and the moment T2 at which the first device receives the message 1. This is not specifically limited in this embodiment of this application.

Optionally, in this embodiment of this application, the message 2 may further include a monitoring granularity 4 corresponding to the first transmission delay. The monitoring granularity 4 may be the same as or different from the monitoring granularity 2 that corresponds to the first transmission delay and that is in the message 1. In other words, a monitoring granularity that corresponds to the first transmission delay and that is in a request sent by the third device may be the same as or different from a monitoring granularity that corresponds to the first transmission delay and that is in a response sent by the first device. For example, the monitoring granularity that corresponds to the first transmission delay and that is in the request sent by the third device may be the device granularity, while the monitoring granularity that corresponds to the first transmission delay and that is in a response sent by the first device may be the flow granularity. This is not specifically limited in this embodiment of this application.

Optionally, in this embodiment of this application, the message 2 may further include the segment identifier 1 corresponding to the first transmission delay, where the segment identifier 1 indicates a segment corresponding to the first transmission delay. This is not specifically limited in this embodiment of this application.

S504a: The first device sends the message 2 to the third device, and the third device receives the message 2 from the first device.

Manner 2: After step S501, the quality of service monitoring method provided in this embodiment of this application further includes steps S502b and S503b.

S502b: The first device generates a message 3.

For example, as shown in FIG. 5A and FIG. 5B, the message 3 in this embodiment of this application may be, for example, a quality of service monitoring request 1. The quality of service monitoring request 1 may include one or more monitoring request packets, and each of the monitoring request packets may include a related sequence number. This is not specifically limited in this embodiment of this application. The message 3 requests to monitor a third transmission delay for packet transmission between the first device and the third device for the terminal. General description is provided herein, and details are not described below again.

In this embodiment of this application, the first device may generate the message 3 after obtaining the information about the first transmission delay. For example, the first device may add the information about the first transmission delay and the information related to the first moment to the message 3. The information related to the first moment may include, for example, a moment T5 at which the first device sends the message 3. This is not specifically limited in this embodiment of this application.

Optionally, in this embodiment of this application, the message 3 may further include a monitoring granularity 4 corresponding to the first transmission delay. This is not specifically limited in this embodiment of this application. For related descriptions of the monitoring granularity 4, refer to those of the monitoring granularity 1. Details are not described herein again.

Optionally, in this embodiment of this application, the message 3 may further include a segment identifier 1 corresponding to the first transmission delay, where the segment identifier 1 indicates a segment corresponding to the first transmission delay. This is not specifically limited in this embodiment of this application.

S503b: The first device sends the message 3 to the third device, and the third device receives the message 3 from the first device.

Manner 3: After step S501, the quality of service monitoring method provided in this embodiment of this application further includes steps S502c to S505c.

S502c: The first device sends a message 4 to the third device, and the third device receives the message 4 from the first device. The message 4 includes the information about the first transmission delay.

Optionally, in this embodiment of this application, the message 4 may further include a monitoring granularity 4 corresponding to the first transmission delay. This is not specifically limited in this embodiment of this application. For related descriptions of the monitoring granularity 4, refer to those of the monitoring granularity 1. Details are not described herein again.

Optionally, in this embodiment of this application, the message 4 may further include a segment identifier 1 corresponding to the first transmission delay, where the segment identifier 1 indicates a segment corresponding to the first transmission delay. This is not specifically limited in this embodiment of this application.

Optionally, the message 4 in this embodiment of this application may be a control packet or a monitoring packet. This is not specifically limited in this embodiment of this application.

S503c: The third device sends a message 5 to the first device, and the first device receives the message 5 from the third device. The message 5 requests to monitor a third transmission delay for packet transmission between the first device and the third device for the terminal.

For example, as shown in FIG. 5A and FIG. 5B, the message 5 in this embodiment of this application may be, for example, a loopback monitoring request 2. The loopback monitoring request 2 may include one or more monitoring request packets, and each of the monitoring request packets may include a related sequence number. For related descriptions, refer to an existing manner of monitoring a third transmission delay, and details are not described herein again.

Optionally, in this embodiment of this application, there is no necessary sequence for performing step S502c and steps S503c to S505c. Step S502c may be performed before one or more of steps S503c to S505c. Alternatively, one or more of steps S503c to S505c may be performed before step S502c. Alternatively, step S502c and one or more of steps S503c to S505c may be simultaneously performed. This is not specifically limited in this embodiment of this application.

S504c. The first device generates a message 6 corresponding to the message 5.

For example, as shown in FIG. 5A and FIG. 5B, the message 6 in this embodiment of this application may be, for example, a loopback monitoring response 2. The loopback monitoring response 2 may include one or more measurement response packets, and each of the measurement request packets may include a related sequence number. This is not specifically limited in this embodiment of this application.

In this embodiment of this application, after receiving the message 5, the first device may generate or construct the message 6 corresponding to the message 5. For example, the first device may add the information related to the first moment to the message 6. The information related to the first moment may include, for example, a moment T2 at which the first device receives the message 5 and a moment T5 at which the first device sends the message 6. Alternatively, the information related to the first moment may include, for example, a difference between a moment T5 at which the first device sends the message 6 and a moment T2 at which the first device receives the message 5. This is not specifically limited in this embodiment of this application.

S505c: The first device sends the message 6 to the third device, and the third device receives the message 6 from the first device.

Manner 4: After step S501, the quality of service monitoring method provided in this embodiment of this application further includes steps S502d to S504d.

S502d: This step is the same as step S502c. For related descriptions, refer to step S502c. Details are not described herein again.

S503d: The first device generates a message 7. The message 7 requests to monitor a third transmission delay for packet transmission between the first device and the third device for the terminal.

For example, as shown in FIG. 5A and FIG. 5B, the message 7 in this embodiment of this application may be, for example, a quality of service monitoring request 2. The quality of service monitoring request 2 may include one or more monitoring request packets, and each of the monitoring request packets may include a related sequence number. This is not specifically limited in this embodiment of this application.

In this embodiment of this application, the message 7 may include the information related to the first moment, and the information related to the first moment may include, for example, a moment T5 at which the first device sends the message 7. For related descriptions, refer to an existing manner of monitoring a third transmission delay. Details are not described herein again.

Optionally, in this embodiment of this application, there is no necessary sequence for performing step S502d and S503d. Step S502d may be performed before step S503d. Alternatively, step S503d may be performed before S502d. Alternatively, S502d and S503d may be simultaneously performed. This is not specifically limited in this embodiment of this application.

S504d: The first device sends the message 7 to the third device, and the third device receives the message 7 from the first device.

After the third device obtains the information about the first transmission delay and the information related to the first moment, the quality of service monitoring method provided in this embodiment of this application further includes steps S506 and S507.

S506: The third device stores the information about the first transmission delay.

S507: The third device determines information about the third transmission delay and determines, based on the information about the first transmission delay and the information related to the first moment, information about the second transmission delay.

For example, it is assumed that the information about the third transmission delay for packet transmission between the first device and the third device for the terminal is an RTT 1, the information about the first transmission delay for packet transmission between the first device and the second device for the terminal is an RRT 2, and the information about the second transmission delay for packet transmission between the second device and the third device for the terminal is an RTT 3.

In this case, for Manner 1 or Manner 3, assuming that a recorded moment at which the third device sends the loopback monitoring request 1 or the loopback monitoring request 2 is T1, and a moment at which the third device receives the loopback monitoring response 1 or the loopback monitoring response 2 is T6:

$RRT\ 1 = (T6-T1)-(T5-T2)$; and $RRT\ 3 = RRT\ 2 + RRT\ 1$.

For Manner 2 or Manner 4, assuming that a moment at which the third device receives the quality of service monitoring request 1 or the quality of service monitoring request 2 is T6:

$RRT\ 1 = T6-T5$; and $RRT\ 3 = RRT\ 2 + RRT\ 1$.

Alternatively, for example, it is assumed that the information about the third transmission delay for packet transmission between the first device and the third device for the terminal is a one-way delay 1, the information about the first transmission delay for packet transmission between the first device and the second device for the terminal is a one-way delay 2, and the information about the second transmission delay for packet transmission between the second device and the third device for the terminal is a one-way delay 3.

In this case, for Manner 1 or Manner 3, assuming that a recorded moment at which the third device sends the loopback monitoring request 1 or the loopback monitoring request 2 is T1, and a moment at which the third device receives the loopback monitoring response 1 or the loopback monitoring response 2 is T6:

One-way delay $1 = [(T6-T1)-(T5-T2)]/2$; and

One-way delay 3=One-way delay 2+One-way delay 1.

For Manner 2 or Manner 4, assuming that a moment at which the third device receives the quality of service monitoring request 1 or the quality of service monitoring request 2 is T6:

One-way delay $1 = (T6-T5)/2$; and

One-way delay 3=One-way delay 2+One-way delay 1.

It should be noted that the foregoing example is described by assuming that an uplink delay and a downlink delay that correspond to a same segment are the same. In other words, the one-way delay may be an UL one-way delay or a DL one-way delay. This is not specifically limited in this embodiment of this application.

According to the quality of service monitoring method provided in this embodiment of this application, when monitoring the information about the third transmission delay for packet transmission between the first device and the third device for the terminal, the third device may receive, from the first device, the information related to the first moment and the information about the first transmission delay for packet transmission between the first device and the second device for the terminal. In addition, the third device may determine, based on the information about the first transmission delay and the information related to the first moment, the information about the second transmission delay for packet transmission between the second device and the third device for the terminal. In other words, the third device may learn of the information about the first transmission delay, the information about the second transmission delay, and the information about the third transmission delay in one procedure of monitoring segment transmission delay information. Therefore, according to the quality of service monitoring method provided in this embodiment of this application, information about a plurality of segment transmission delays can be obtained in one procedure of monitoring segment transmission delay information. This simplifies an existing method for monitoring segment transmission delay information.

Actions of the first device or the third device in steps S501 to S507 may be performed by the processor 401 in the communications device 400 shown in FIG. 4 by invoking the application program code stored in the memory 403. This is not limited in this embodiment.

Figure 6A:
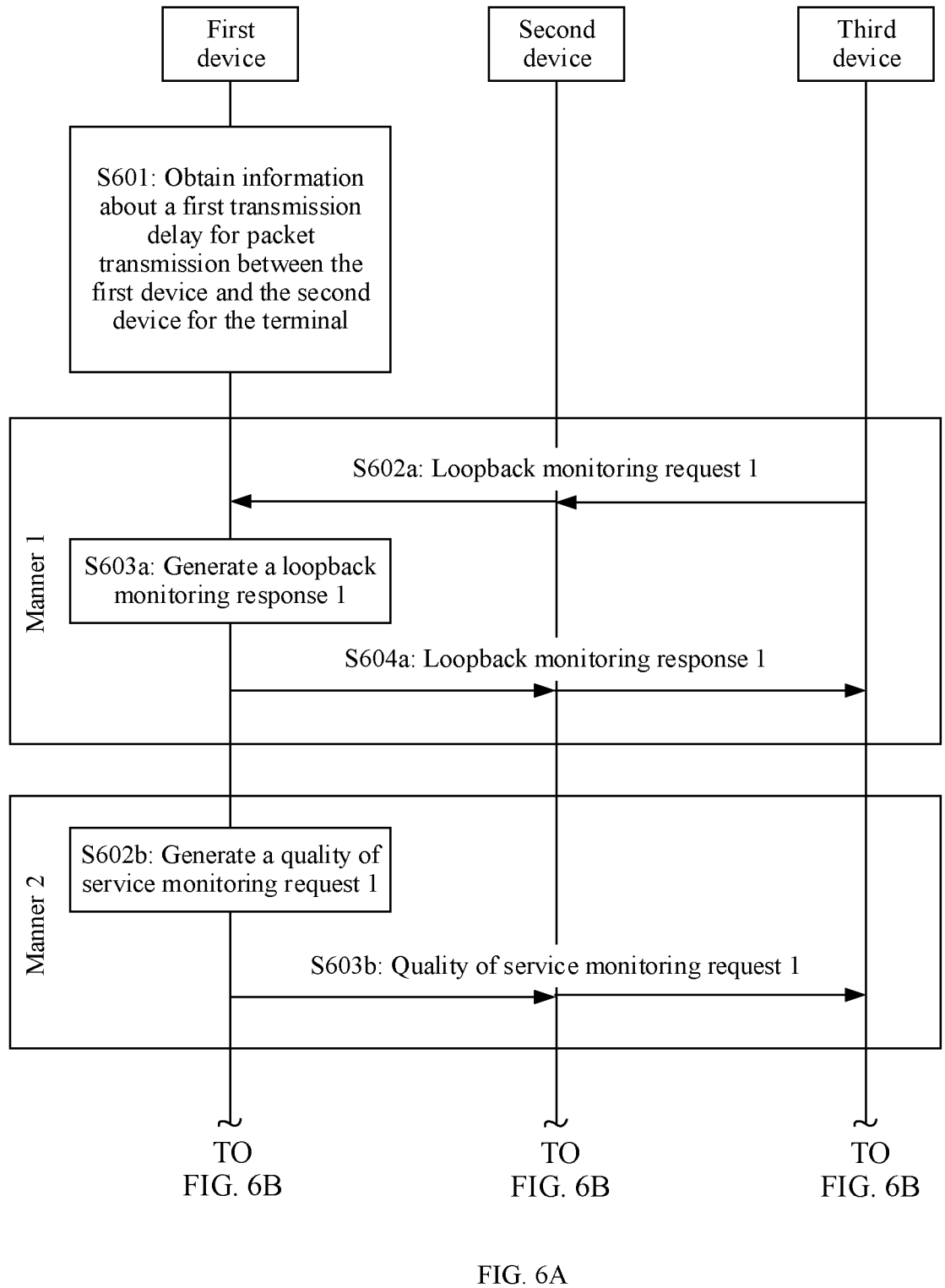
FIG. 6A and FIG. 6B are a second schematic flowchart of a quality of service monitoring method according to an embodiment of this application.
Figure 6B:
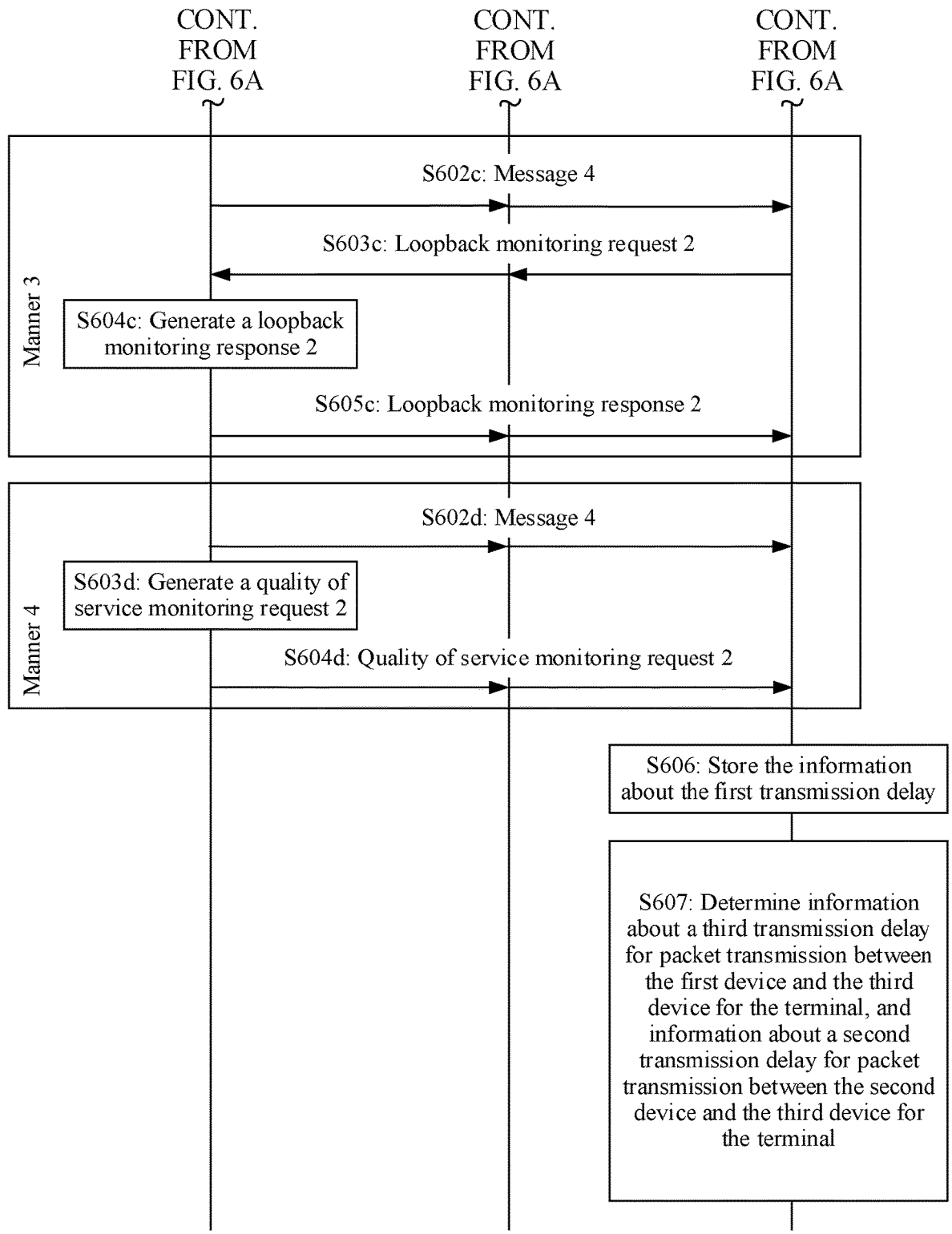

Optionally, for example, the quality of service monitoring system in FIG. 1 is applied to the 5G network shown in FIG. 3; and a first device is a terminal, a second device is an access device, and a third device is a UPF network element; or a first device is a UPF network element, a second device is an access device, and a third device is a terminal. FIG. 6A and FIG. 6B show a quality of service monitoring method according to an embodiment of this application. The quality of service monitoring method includes the following steps.

S601: This step is similar to step S501. For details, refer to step S501 in the embodiment shown in FIG. 5A and FIG. 5B. Details are not described herein again.

Optionally, in this embodiment of this application, a third device may obtain information related to a first moment and information about a first transmission delay in any one of the following manners 1 to 4.

Manner 1: The quality of service monitoring method provided in this embodiment of this application further includes steps S602a to S604a.

S602a: The third device sends a message 1 to the first device via the second device, and the first device receives the message 1 from the third device at a moment T2.

For example, as shown in FIG. 6A and FIG. 6B, the message 1 in this embodiment of this application may be, for example, a loopback monitoring request 1. For related descriptions, refer to the embodiment shown in FIG. 6A and FIG. 6B. Details are not described herein again.

For other related descriptions of the message 1, refer to step S502a in the embodiment shown in FIG. 5A and FIG. 5B. Details are not described herein again.

In this embodiment of this application, in a scenario in which the second device is an access device and the third device is a terminal, a second transmission delay for packet transmission between the second device and the third device may also be referred to as an air interface transmission delay or a Uu interface delay. This is not specifically limited in this embodiment of this application.

It should be noted that, when being transmitted between the terminal and the access device, a message (including the message 1 in step S602a, a message 2, a message 3, a message 4, a message 5, a message 6, or a message 7 below) in this embodiment of this application is transmitted using a bearer corresponding to a session of the terminal. When being transmitted between the access device and the UPF network element, the message in this embodiment of this application is transmitted through a GTP-U tunnel corresponding to the session of the terminal. In other words, a transmission channel for the message needs to be switched. For details, refer to an existing implementation. Details are not described herein.

Optionally, in this embodiment of this application, there is no necessary sequence for performing steps S601 and S602a. Step S601 may be performed before step S602a. Alternatively, step S602a may be performed before step S601. For example, after receiving the loopback monitoring request 1 from the third device, the first device initiates monitoring of the first transmission delay for packet transmission between the first device and the second device for the terminal. Alternatively, steps S601 and S602a may be simultaneously performed. This is not specifically limited in this embodiment of this application.

S603a: This step is similar to step S503a. For details, refer to step S503a in the embodiment shown in FIG. 5A and FIG. 5B. Details are not described herein again.

S604a: The first device sends the message 2 to the third device via the second device, and the third device receives the message 2 from the first device.

Manner 2: After step S601, the quality of service monitoring method provided in this embodiment of this application further includes steps S602b and S603b.

S602b: This step is similar to step S502b. For details, refer to step S502b in the embodiment shown in FIG. 5A and FIG. 5B. Details are not described herein again.

S603b: The first device sends the message 3 to the third device via the second device, and the third device receives the message 3 from the first device.

Manner 3: After step S601, the quality of service monitoring method provided in this embodiment of this application further includes steps S602c to S605c.

S602c: The first device sends the message 4 to the third device via the second device, and the third device receives the message 4 from the first device. The message 4 includes the information about the first transmission delay.

For related descriptions of the message 4, refer to step S502c in the embodiment shown in FIG. 5A and FIG. 5B. Details are not described herein again.

S603c: The third device sends the message 5 to the first device via the second device, and the first device receives the message 5 from the third device. The message 5 requests to monitor a third transmission delay for packet transmission between the first device and the third device for the terminal.

For related descriptions of the message 5, refer to step S503c in the embodiment shown in FIG. 5A and FIG. 5B. Details are not described herein again.

Optionally, in this embodiment of this application, there is no necessary sequence for performing step S602c and steps S603c to S605c. Step S602c may be performed before one or more of steps S603c to S605c. Alternatively, one or more of steps S603c to S605c may be performed before step S602c. Alternatively, step S602c and one or more of steps S603c to S605c may be simultaneously performed. This is not specifically limited in this embodiment of this application.

S604c: This step is similar to step S504c. For details, refer to step S504c in the embodiment shown in FIG. 5A and FIG. 5B. Details are not described herein again.

S605c: The first device sends the message 6 to the third device via the second device, and the third device receives the message 6 from the first device.

Manner 4: After step S601, the quality of service monitoring method provided in this embodiment of this application further includes steps S602d to S604d.

S602d: This step is the same as step S602c. For related descriptions, refer to step S602c. Details are not described herein again.

S603d: This step is similar to step S503d. For details, refer to step S503d in the embodiment shown in FIG. 5A and FIG. 5B. Details are not described herein again.

Optionally, in this embodiment of this application, there is no necessary sequence for performing step S602d and S603d. Step S602d may be performed before step S603d. Alternatively, step S603d may be performed before S602d. Alternatively, S602d and S603d may be simultaneously performed. This is not specifically limited in this embodiment of this application.

S604d: The first device sends the message 7 to the third device via the second device, and the third device receives the message 7 from the first device.

After the third device obtains the information about the first transmission delay and the information related to the first moment, the quality of service monitoring method provided in this embodiment of this application further includes steps S606 and S607.

S606: The third device stores the information about the first transmission delay.

S607: The third device determines information about the third transmission delay and determines, based on the information about the first transmission delay and the information related to the first moment, information about the second transmission delay.

For example, it is assumed that the information about the third transmission delay for packet transmission between the first device and the third device for the terminal is an RTT 1, the information about the first transmission delay for packet transmission between the first device and the second device for the terminal is an RRT 2, and the information about the second transmission delay for packet transmission between the second device and the third device for the terminal is an RTT 3.

In this case, for Manner 1 or Manner 3, assuming that a recorded moment at which the third device sends the loopback monitoring request 1 or a loopback monitoring request 2 is T1, and a moment at which the third device receives a loopback monitoring response 1 or a loopback monitoring response 2 is T6:

$$RRT\ 1=(T6-T1)-(T5-T2);\ \text{and}$$

$$RRT\ 3=RRT\ 1-RRT\ 2.$$

For Manner 2 or Manner 4, assuming that a moment at which the third device receives a quality of service monitoring request 1 or a quality of service monitoring request 2 is T6:

$$RRT\ 1=T6-T5;\ \text{and}$$

$$RRT\ 3=RRT\ 1-RRT\ 2.$$

Alternatively, for example, it is assumed that the information about the third transmission delay for packet transmission between the first device and the third device for the terminal is a one-way delay 1, the information about the first transmission delay for packet transmission between the first device and the second device for the terminal is a one-way delay 2, and the information about the second transmission delay for packet transmission between the second device and the third device for the terminal is a one-way delay 3.

In this case, for Manner 1 or Manner 3, assuming that a recorded moment at which the third device sends the loopback monitoring request 1 or a loopback monitoring request 2 is T1, and a moment at which the third device receives a loopback monitoring response 1 or a loopback monitoring response 2 is T6:

$$\text{One-way delay } 1=[(T6-T1)-(T5-T2)]/2;\ \text{and}$$

$$\text{One-way delay } 3=\text{One-way delay } 1-\text{One-way delay } 2.$$

For Manner 2 or Manner 4, it is assumed that a moment at which the third device receives a quality of service monitoring request 1 or a quality of service monitoring request 2 is T6:

$$\text{One-way delay } 1=(T6-T5)/2;\ \text{and}$$

$$\text{One-way delay } 3=\text{One-way delay } 1-\text{One-way delay } 2.$$

It should be noted that the foregoing example is described by assuming that an uplink delay and a downlink delay that correspond to a same segment are the same. In other words, the one-way delay may be an UL one-way delay or a DL one-way delay. This is not specifically limited in this embodiment of this application.

According to the quality of service monitoring method provided in this embodiment of this application, when monitoring the information about the third transmission delay for packet transmission between the first device and the third device for the terminal, the third device may receive, from the first device, the information related to the first moment and the information about the first transmission delay for packet transmission between the first device and the second device for the terminal. In addition, the third device may determine, based on the information about the first transmission delay and the information related to the first moment, the information about the second transmission delay for packet transmission between the second device and the third device for the terminal. In other words, the third device may learn of the information about the first transmission delay, the information about the second transmission delay, and the information about the third transmission delay in one procedure of monitoring segment transmission delay information. Therefore, according to the quality of service monitoring method provided in this embodiment of this application, information about a plurality of segment transmission delays can be obtained in one procedure of monitoring segment transmission delay information. This simplifies an existing method for monitoring segment transmission delay information.

Actions of the first device or the third device in steps S601 to S607 may be performed by the processor 401 in the communications device 400 shown in FIG. 4 by invoking the application program code stored in the memory 403. This is not limited in this embodiment.

Figure 7A:
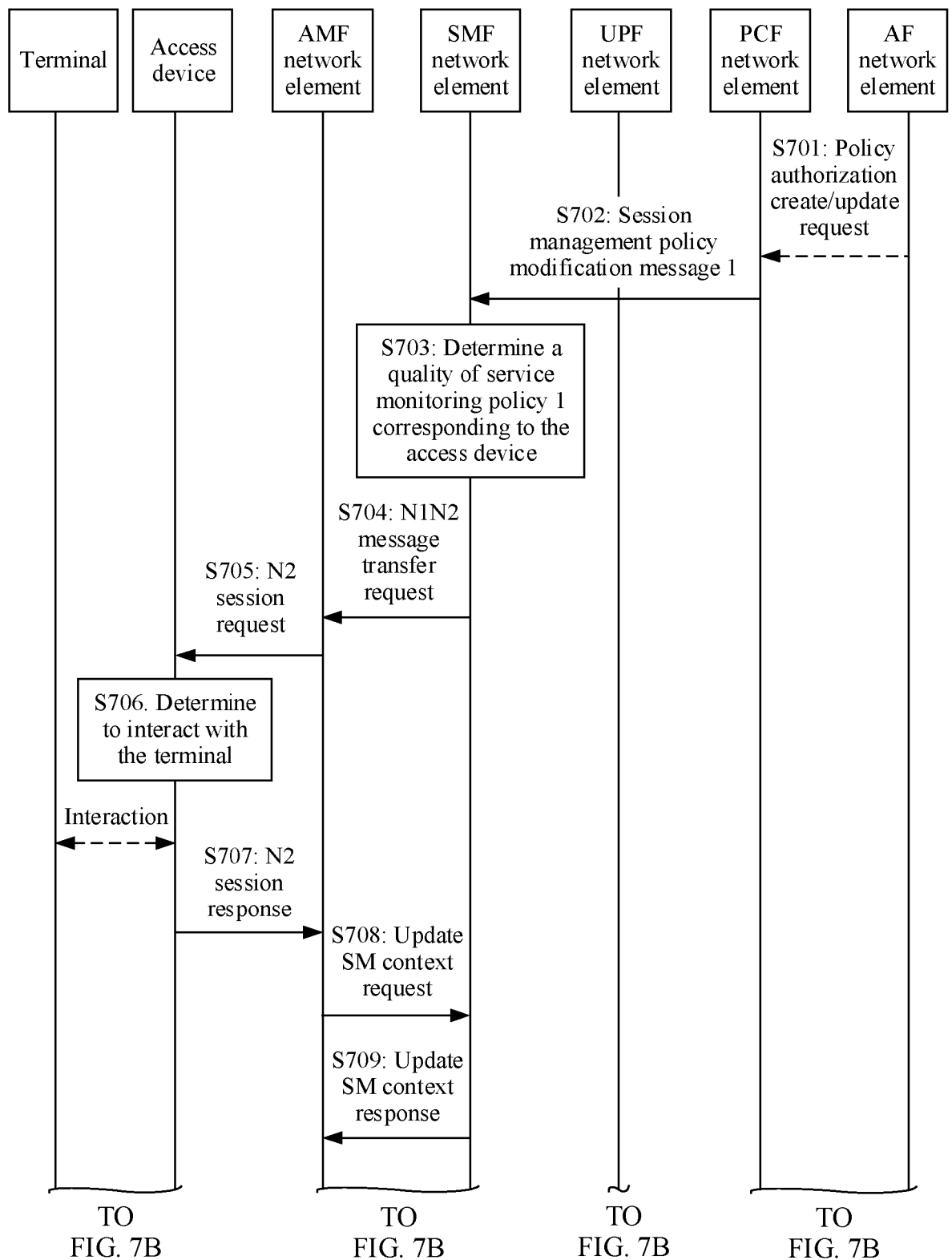
FIG. 7A and FIG. 7B are a schematic flowchart of a quality of service monitoring activation method according to an embodiment of this application.
Figure 7B:
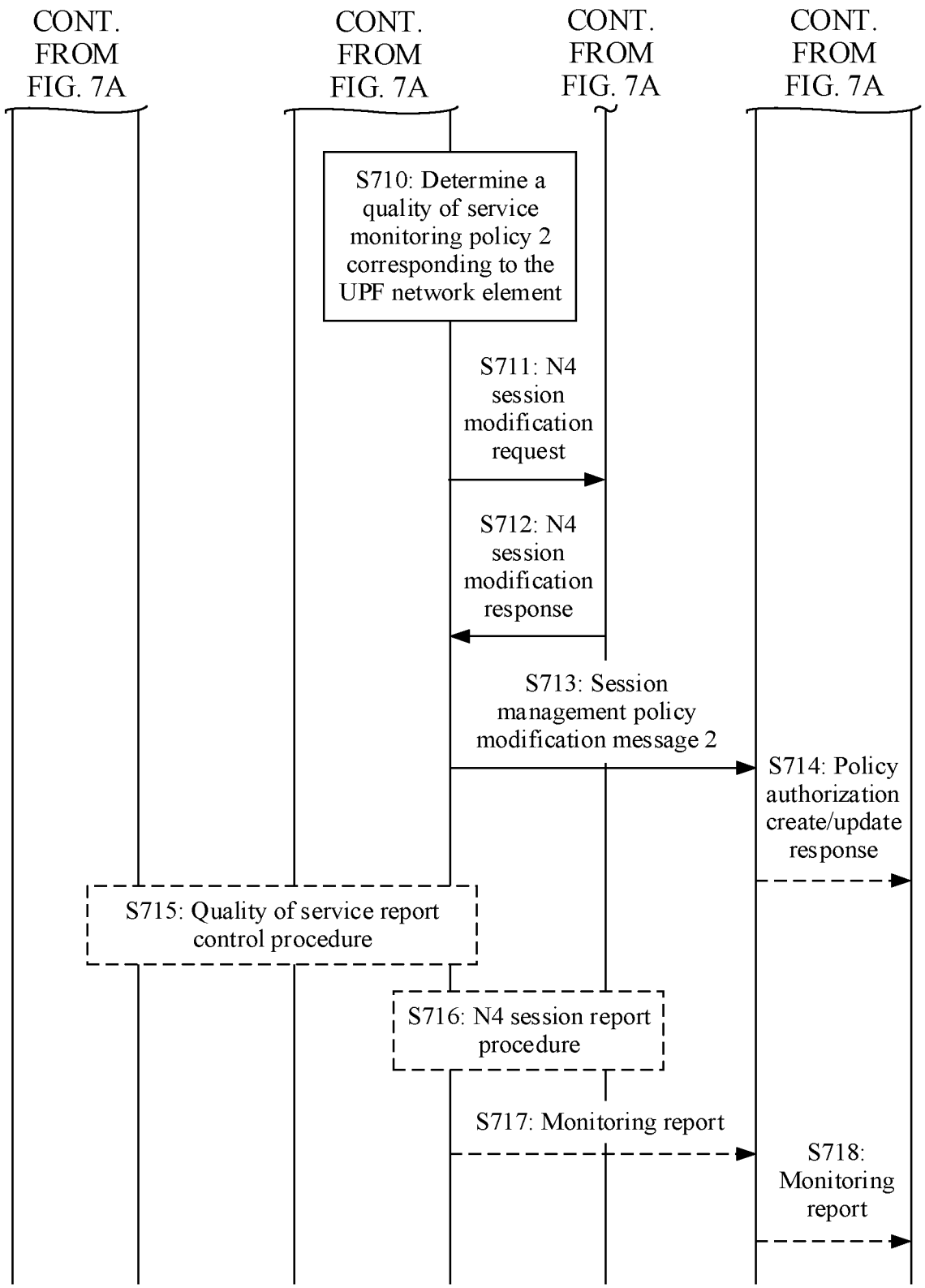

Optionally, for example, the quality of service monitoring system in FIG. 2 is applied to the 5G network shown in FIG. 3, and a first device is an access device or a UPF network element. FIG. 7A and FIG. 7B show a quality of service monitoring activation method according to an embodiment of this application. The quality of service monitoring activation method includes the following steps.

S701: Optionally, an application function (AF) network element sends a message 1 to a PCF network element, and the PCF network element receives the message 1 from the AF network element. The message 1 includes one or more quality of service monitoring policies to be sent to an SMF network element.

For example, as shown in FIG. 7A and FIG. 7B, the message 1 in this embodiment of this application may be, for example, a policy authorization create/update request. This is not specifically limited in this embodiment of this application.

Optionally, in this embodiment of this application, the AF network element may send the message 1 directly to the PCF network element, or send the message 1 to the PCF network element via a network exposure function (NEF) network element. This is not specifically limited in this embodiment of this application.

Optionally, in this embodiment of this application, for example, the quality of service monitoring policy to be sent to the SMF network element may include at least one of a to-be-monitored quality of service parameter or an event in which a monitoring report needs to be reported to the SMF network element. This is not specifically limited in this embodiment of this application.

In an example, the to-be-monitored quality of service parameter may include at least one of a guaranteed flow bit rate (GFBR), an uplink/downlink maximum flow bit rate (MFBR), data burst volume within a packet delay budget at an access point, a frame error rate (FER), a segment transmission delay, or packet loss information. The segment transmission delay may include, for example, a one-way delay or a loopback delay. This is not specifically limited in this embodiment of this application. For example, the segment transmission delay may be a one-way transmission delay or a two way transmission delay. This is not specifically limited in this embodiment of this application.

In an example, the event in which a monitoring report needs to be reported to the SMF network element may include: the quality of service parameter exceeds a preset threshold (for example, a packet loss rate is greater than 0.5%); a terminal enters an idle mode or a session is released; or periodic reporting is performed. This is not specifically limited in this embodiment of this application.

Optionally, in this embodiment of this application, the quality of service monitoring policy to be sent to the SMF network element may further include, for example, a processing rule of a timeout packet, for example, discarding the packet or sending the packet to the terminal. This is not specifically limited in this embodiment of this application.

Optionally, in this embodiment of this application, the quality of service monitoring policy to be sent to the SMF network element may further include, for example, a length of a monitoring packet used for quality of service monitoring or a monitoring period used for quality of service monitoring. This is not specifically limited in this embodiment of this application.

Optionally, in this embodiment of this application, the length of the monitoring packet used for quality of service monitoring may be equal to a typical packet length of a valid service data packet. This is not specifically limited in this embodiment of this application.

Optionally, in this embodiment of this application, the quality of service monitoring policy to be sent to the SMF network element may further include information about one or more devices that may subsequently use the quality of service monitoring policy. This is not specifically limited in this embodiment of this application.

S702: The PCF network element sends a message 2 to the SMF network element, and the SMF network element receives the message 2 from the PCF network element. The message 2 includes the one or more quality of service monitoring policies.

In an example, as shown in FIG. 7A and FIG. 7B, the message 2 in this embodiment of this application may be a session management policy modification request 1. This is not specifically limited in this embodiment of this application.

Optionally, in this embodiment of this application, the PCF network element may determine, based on subscription information or the message 1 received from the AF network element, to send the message 2 to the SMF network element. This is not specifically limited in this embodiment of this application.

S703: The SMF network element determines a quality of service monitoring policy 1 corresponding to the access device from the one or more quality of service monitoring policies.

For related descriptions of the quality of service monitoring policy 1, refer to those of the quality of service monitoring policy in step S701. Details are not described herein again.

Optionally, in a possible implementation, the quality of service monitoring policy includes information about the access device. In this case, that the SMF network element determines a quality of service monitoring policy 1 corresponding to the access device from the one or more quality of service monitoring policies includes: The SMF network element determines, based on the information about the access device, the quality of service monitoring policy 1 corresponding to the access device from the one or more quality of service monitoring policies. In an example, in this embodiment of this application, the information about the access device may be an identifier of the access device or an IP address of the access device. This is not specifically limited in this embodiment of this application.

Optionally, in a possible implementation, the quality of service monitoring policy 1 corresponding to the access device includes a to-be-monitored quality of service parameter 1 corresponding to the access device. In this case, that the SMF network element determines a quality of service monitoring policy 1 corresponding to the access device from the one or more quality of service monitoring policies includes: The SMF network element determines, based on a parameter type of the quality of service parameter 1, the to-be-monitored first quality of service parameter 1 corresponding to the access device. For example, the parameter type in this embodiment of this application may be a transmission rate, a data burst volume type, a FER, a transmission delay, or packet loss information on a Uu interface and/or an N3 interface. For example, the SMF network element may send, to the access device, a quality of service parameter 1 whose parameter type is at least one of the transmission rate, the burst data volume type, the FER, the transmission delay, or the packet loss information on the Uu interface and/or the N3 interface.

Optionally, in this embodiment of this application, when the quality of service parameter 1 includes a segment transmission delay, the segment transmission delay may be a first transmission delay for packet transmission between the access device and a second device for the terminal, or a third transmission delay for packet transmission between the access device and a third device for the terminal. Herein, the second device may be the terminal, and the third device may be the UPF network element. Alternatively, the second device may be the UPF network element, and the third device may be the terminal. For details, refer to the embodiment shown in FIG. 5A and FIG. 5B. Details are not described herein again.

S704: The SMF network element sends a message 3 to an AMF network element, and the AMF network element receives the message 3 from the SMF network element. The message 3 includes the quality of service monitoring policy 1 corresponding to the access device.

In an example, as shown in FIG. 7A and FIG. 7B, the message 3 in this embodiment of this application may be an N1N2 message transfer request. This is not specifically limited in this embodiment of this application.

S705: The AMF network element sends a message 4 to the access device, and the access device receives the message 4 from the AMF network element. The message 4 includes the quality of service monitoring policy 1 corresponding to the access device.

In an example, as shown in FIG. 7A and FIG. 7B, the message 4 in this embodiment of this application may be an N2 session request. This is not specifically limited in this embodiment of this application.

Optionally, in this embodiment of this application, the SMF network element may further send third indication information to the access device via the AMF network element. The third indication information indicates to the first device to send, after detecting information about the first transmission delay, the information about the first transmission delay to the third device. When the first transmission delay is a transmission delay for packet transmission between the access device and the terminal for the terminal, the third device herein is the UPF network element. When the first transmission delay is a transmission delay for packet transmission between the access device and the UPF network element for the terminal, the third device herein is the terminal. General description is provided herein, and details are not described below again.

S706: The access device determines, according to the quality of service monitoring policy 1 corresponding to the access device, to interact with the terminal.

For example, the access device may determine, according to the quality of service monitoring policy 1 corresponding to the access device, to perform parameter negotiation or configuration with the terminal, for example, negotiate a delay detection period and statistics initialization. This is not specifically limited in this embodiment of this application.

Optionally, after determining to interact with the terminal, the access device may initiate a corresponding interaction procedure, as shown by a dashed line in FIG. 7A and FIG. 7B. This is not specifically limited in this embodiment of this application.

S707: The access device sends a message 5 to the AMF network element, and the AMF network element receives the message 5 from the access device. The message 5 includes information indicating whether the access device accepts the quality of service monitoring policy 1.

In an example, as shown in FIG. 7A and FIG. 7B, the message 5 in this embodiment of this application may be an N2 session response. This is not specifically limited in this embodiment of this application.

S708: The AMF network element sends a message 6 to the SMF network element, and the SMF network element receives the message 6 from the AMF network element. The message 6 includes information indicating whether the access device accepts the quality of service monitoring policy 1.

In an example, as shown in FIG. 7A and FIG. 7B, the message 6 in this embodiment of this application may be an update session management (SM) context request. This is not specifically limited in this embodiment of this application.

S709: The SMF network element sends a message 7 to the AMF network element, and the AMF network element receives the message 7 from the SMF network element.

In an example, as shown in FIG. 7A and FIG. 7B, the message 7 in this embodiment of this application may be an update SM context response. This is not specifically limited in this embodiment of this application.

S710: The SMF network element determines a quality of service monitoring policy 2 corresponding to the UPF network element from the one or more quality of service monitoring policies.

For related descriptions of the quality of service monitoring policy 2, refer to those of the quality of service monitoring policy in step S701. Details are not described herein again.

Optionally, in a possible implementation, the quality of service monitoring policy includes information about the UPF network element. In this case, that the SMF network element determines a quality of service monitoring policy 2 corresponding to the UPF network element from the one or more quality of service monitoring policies includes: The SMF network element determines, based on the information about the UPF network element, the quality of service monitoring policy 2 corresponding to the UPF network element from the one or more quality of service monitoring policies. In an example, in this embodiment of this application, the information about the UPF network element may be an identifier of the UPF network element or an IP address of the UPF network element. This is not specifically limited in this embodiment of this application.

Optionally, in a possible implementation, the quality of service monitoring policy 2 corresponding to the UPF network element includes a to-be-monitored quality of service parameter 2 corresponding to the UPF network element. In this case, that the SMF network element determines a quality of service monitoring policy 2 corresponding to the UPF network element from the one or more quality of service monitoring policies includes: The SMF network element determines, based on a parameter type of the quality of service parameter 2, the to-be-monitored quality of service parameter 2 corresponding to the UPF network element. In an example, the parameter type in this embodiment of this application may be a transmission rate, a data burst volume type, a FER, a transmission delay, or packet loss information on the Uu interface and/or the N3 interface. For example, the SMF network element may send, to the UPF network element, a quality of service parameter 2 whose parameter type is at least one of the transmission rate, the burst data volume type, the FER, the transmission delay, or the packet loss information on the Uu interface and/or the N3 interface.

Optionally, in this embodiment of this application, when the quality of service parameter 2 includes a segment transmission delay, the segment transmission delay may be a first transmission delay for packet transmission between the UPF network element and the access device for the terminal, or a third transmission delay for packet transmission between the UPF network element and the terminal for the terminal.

S711: The SMF network element sends a message 8 to the UPF network element, and the UPF network element receives the message 8 from the SMF network element. The message 8 includes the quality of service monitoring policy 2 corresponding to the UPF network element.

In an example, as shown in FIG. 7A and FIG. 7B, the message 8 in this embodiment of this application may be an N4 session modification request. This is not specifically limited in this embodiment of this application.

S712: The UPF network element sends a message 9 to the SMF network element, and the SMF network element receives the message 9 from the UPF network element. The message 9 includes information indicating whether the UPF network element accepts the quality of service monitoring policy 2.

In an example, as shown in FIG. 7A and FIG. 7B, the message 9 in this embodiment of this application may be an N4 session modification response. This is not specifically limited in this embodiment of this application.

It should be noted that, in steps S703 to S712, descriptions are provided using an example in which the SMF network element sends the quality of service monitoring policy 1 corresponding to the access device to the access device, and sends the quality of service monitoring policy 2 corresponding to the UPF network element to the UPF network element. Certainly, in this embodiment of this application, the SMF may send the quality of service monitoring policy 1 corresponding to the access device to the access device, or send the quality of service monitoring policy 2 corresponding to the UPF network element to the UPF network element. This is not specifically limited in this embodiment of this application. In addition, with reference to a manner in this embodiment of this application, the SMF network element may also send a quality of service monitoring policy 3 corresponding to the terminal to the terminal after determining the quality of service monitoring policy 3 of the terminal from the one or more quality of service monitoring policies. Details are not described herein again.

Particularly, after obtaining the quality of service monitoring policy 1 corresponding to the access device, the access device may perform quality of service monitoring with reference to the manner in the embodiment shown in FIG. 5A and FIG. 5B. For example, the quality of service monitoring policy 1 includes the to-be-monitored quality of service parameter 1 corresponding to the access device, the quality of service parameter 1 includes a segment transmission delay, and the segment transmission delay is a transmission delay for packet transmission between the access device and the terminal for the terminal. In this case, the access device may initiate monitoring of the transmission delay for packet transmission between the access device and the terminal for the terminal. Alternatively, the quality of service monitoring policy 1 includes the to-be-monitored quality of service parameter 1 corresponding to the access device, the quality of service parameter 1 includes a segment transmission delay, and the segment transmission delay is a transmission delay for packet transmission between the access device and the UPF network element for the terminal. In this case, the access device may initiate monitoring of the transmission delay for packet transmission between the access device and the UPF network element for the terminal. For details, refer to the embodiment shown in FIG. 5A and FIG. 5B. Details are not described herein again.

Particularly, after obtaining the quality of service monitoring policy 2 corresponding to the UPF network element, the UPF network element may perform quality of service monitoring with reference to the manner in the embodiment shown in FIG. 6A and FIG. 6B. For example, the quality of service monitoring policy 2 includes the to-be-monitored quality of service parameter 2 corresponding to the UPF network element, the quality of service parameter 2 includes a segment transmission delay, and the segment transmission delay is a transmission delay for packet transmission between the UPF network element and the access device for the terminal. In this case, the UPF network element may initiate monitoring of the transmission delay for packet transmission between the UPF network element and the access device for the terminal. For details, refer to the embodiment shown in FIG. 5A and FIG. 5B. Details are not described herein again.

Particularly, after obtaining the quality of service monitoring policy 3 corresponding to the terminal, the terminal may perform quality of service monitoring with reference to the manner in the embodiment shown in FIG. 6A and FIG. 6B. For example, the quality of service monitoring policy 3 includes a to-be-monitored quality of service parameter 3 corresponding to the terminal, the quality of service parameter 3 includes a segment transmission delay, and the segment transmission delay is a transmission delay for packet transmission between the terminal and the access device for the terminal. In this case, the terminal may initiate monitoring of the transmission delay for packet transmission between the terminal and the access device for the terminal. For details, refer to the embodiment shown in FIG. 6A and FIG. 6B. Details are not described herein again.

S713: The SMF network element sends a message 10 to the PCF network element, and the PCF network element receives the message 10 from the SMF network element. The message 10 includes configuration or deployment results of the one or more quality of service monitoring policies. For example, the SMF network element successfully configures the quality of service monitoring policy 1 or the quality of service monitoring policy 2; or a quality of service parameter of a parameter type is unsuccessfully configured.

In an example, as shown in FIG. 7A and FIG. 7B, the message 10 in this embodiment of this application may be a session management policy modification request 2. This is not specifically limited in this embodiment of this application.

S714: Optionally, the PCF network element sends a message 11 to the AF network element, and the AF network element receives the message 11 from the PCF network element. The message 11 includes a result of executing the one or more quality of service monitoring policies. For example, the access device accepts the quality of service monitoring policy 1, and/or the UPF network element accepts the quality of service monitoring policy 2.

In an example, as shown in FIG. 7A and FIG. 7B, the message 11 in this embodiment of this application may be a policy authorization create/update response. This is not specifically limited in this embodiment of this application.

It should be noted that step S713 in this embodiment of this application is performed when step S701 needs to be performed. General description is provided herein, and details are not described below again.

S715. Optionally, when a condition of an event for reporting a monitoring report by the access device is met, the access device creates a monitoring report 1, and sends the monitoring report 1 to the SMF network element through a quality of service report control procedure; and the SMF network element receives the monitoring report 1 from the access device.

Optionally, the monitoring report 1 in this embodiment of this application may include at least one of an event timestamp, an identifier of a monitored quality of service parameter, a monitored value of a monitored quality of service parameter, an identifier of the terminal, a session identifier, or a QoS flow identifier. This is not specifically limited in this embodiment of this application.

S716. Optionally, when a condition of an event for reporting a monitoring report by the UPF network element is met, the UPF network element creates a monitoring report 2, and sends the monitoring report 2 to the SMF network element through an N4 session report procedure; and the SMF network element receives the monitoring report 2 from the UPF network element.

Optionally, the monitoring report 2 in this embodiment of this application may include at least one of an event timestamp, an identifier of a monitored quality of service parameter, a monitored value of a monitored quality of service parameter, an identifier of the terminal, a session identifier, or a QoS flow identifier. This is not specifically limited in this embodiment of this application.

S717: Optionally, the SMF network element sends the monitoring report to the PCF network element, and the PCF network element receives the monitoring report from the SMF network element.

Optionally, in this embodiment of this application, the SMF network element may send the monitoring report 1 to the PCF network element after receiving the monitoring report 1 reported by the access device, and send the monitoring report 2 to the PCF network element after receiving the monitoring report 2 reported by the UPF network element. Alternatively, the SMF network element may send the monitoring report 1 and the monitoring report 2 to the PCF network element after receiving the monitoring report 1 reported by the access device and the monitoring report 2 reported by the UPF network element. This is not specifically limited in this embodiment of this application.

S718: Optionally, the PCF network element sends the monitoring report to the AF network element, and the AF network element receives the monitoring report from the PCF network element.

Optionally, in this embodiment of this application, the PCF network element may send the monitoring report 1 to the AF network element after receiving the monitoring report 1 reported by the SMF network element, and send the monitoring report 2 to the AF network element after receiving the monitoring report 2 reported by the SMF network element. Alternatively, the PCF network element may send the monitoring report 1 and the monitoring report 2 to the AF network element after receiving the monitoring report 1 reported by the access device and the monitoring report 2 reported by the UPF network element. This is not specifically limited in this embodiment of this application.

It should be noted that step S717 in this embodiment of this application is optionally performed when step S701 needs to be performed. General description is provided herein, and details are not described below again.

According to the quality of service monitoring activation method provided in this embodiment of this application, a required quality of service monitoring policy may be provided to a corresponding device in a quality of service monitoring process. Therefore, the device may be activated to initiate a quality of service monitoring procedure or the device may be activated to report a monitoring report to a session management network element.

Actions of the SMF network element in steps S701 to S718 may be performed by the processor 401 in the communications device 400 shown in FIG. 4 by invoking the application program code stored in the memory 403. This is not limited in this embodiment.

Figure 12:
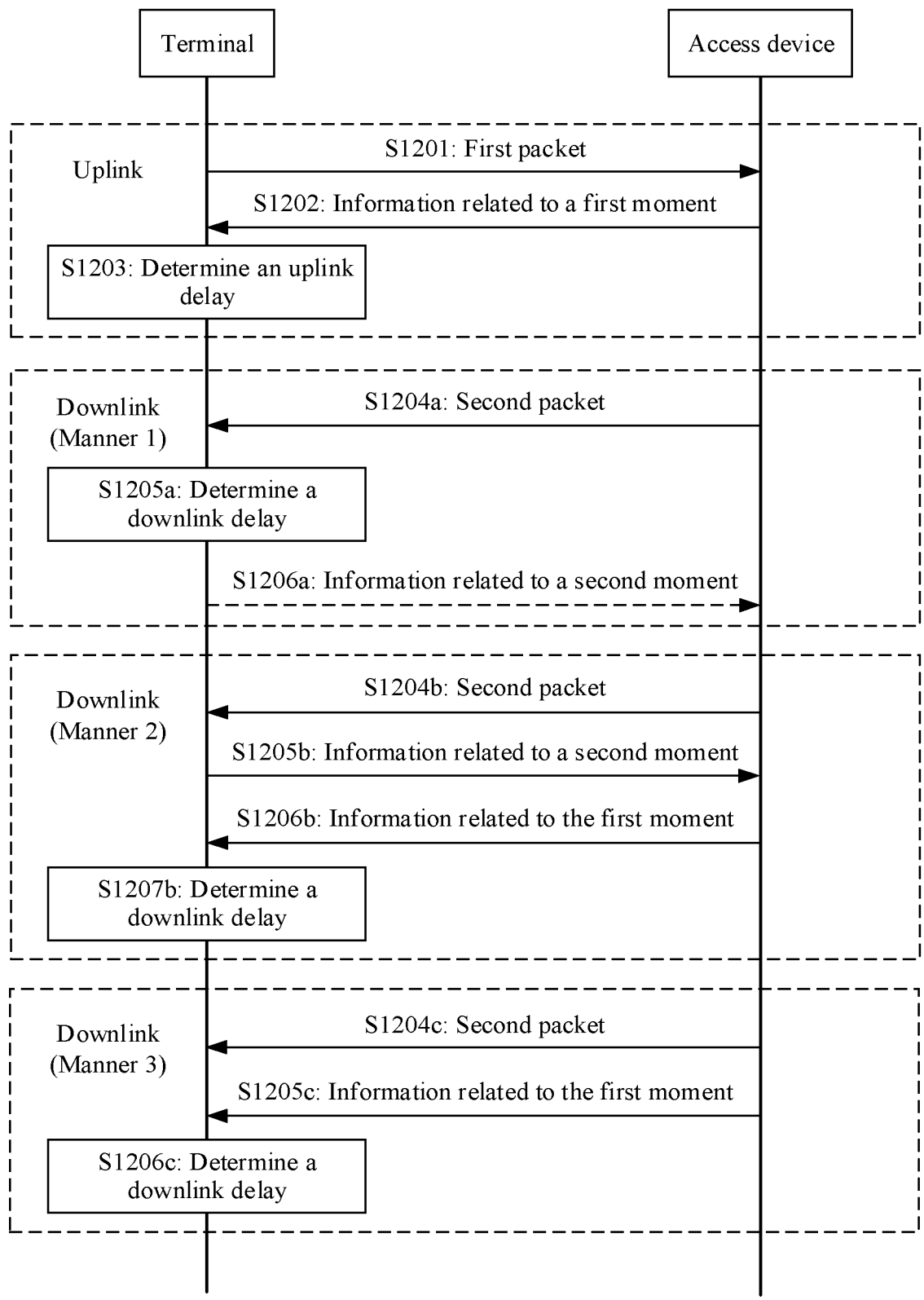
FIG. 12 is a third schematic flowchart of a quality of service monitoring method according to an embodiment of this application.

For example, the quality of service monitoring system in FIG. 11 is applied to the 5G network shown in FIG. 3. FIG. 12 shows a quality of service monitoring method according to an embodiment of this application. The quality of service monitoring method includes uplink delay monitoring and downlink delay monitoring that are performed between a terminal and an access device.

The uplink delay monitoring includes steps S1201 to S1203.

S1201: The terminal sends a first packet to the access device, and the access device receives the first packet from the terminal.

Optionally, in this embodiment of this application, the terminal may send one packet to the access device at a moment, or may send a plurality of packets to the access device at a moment. Therefore, the first packet may be a separate packet sent at a moment, or one of a plurality of packets sent at a moment. This is not specifically limited in this embodiment of this application.

Optionally, the first packet in this embodiment of this application is used for delay monitoring.

In a possible implementation, the first packet carries first indication information, and the first indication information indicates that the first packet is used for delay monitoring. After receiving the first packet, the access device may learn, based on the first indication information, that the first packet is used for delay monitoring.

Alternatively, in another possible implementation, the first packet does not carry first indication information, but the terminal and the access device negotiate, or agree on, or receive, or configure, in advance, a feature of a packet used for delay monitoring, for example, a sequence number rule of the packet. Then, after receiving the first packet, the access device may determine, based on a feature of the first packet, for example, a sequence number of the first packet, in combination with a rule that is negotiated or agreed on in advance, that the first packet is used for delay monitoring.

Certainly, the access device may independently select a packet for delay monitoring. Alternatively, the access device determines, in another manner, that a received uplink packet is used for delay monitoring. This is not specifically limited in this embodiment of this application.

S1202: The access device sends information related to a first moment to the terminal, and the terminal receives the information related to the first moment from the access device.

The first moment is a moment at which the access device receives the first packet sent by the terminal.

Optionally, in this embodiment of this application, the information related to the first moment includes information indicating the first moment, for example, the first moment.

Alternatively, optionally, in this embodiment of this application, the information related to the first moment includes a difference between the first moment and a second moment, where the second moment is a moment at which the terminal sends the first packet to the access device.

For example, when scheduling an uplink packet of the terminal, the access device indicates a moment (which, for example, includes the second moment corresponding to the first packet) at which an uplink frame of the terminal is sent. In this case, when receiving the first packet used for delay monitoring, the access device may obtain the difference between the first moment and the second moment based on the second moment and the moment at which the access device receives the first packet sent by the terminal (namely, the first moment). The difference may be used as the information related to the first moment and is sent to the terminal. Assuming that the first moment is denoted as t1 and the second moment is denoted as t2, the difference between the first moment and the second moment is denoted as (t1−t2).

Optionally, in this embodiment of this application, the access device may send the information related to the first moment to the terminal using radio resource control (RRC) signaling. Alternatively, the access device may send the information related to the first moment to the terminal by adding the information related to the first moment to a downlink packet (the information related to the first moment may be considered as a timestamp). This is not specifically limited in this embodiment of this application.

S1203: The terminal determines, based on the information related to the first moment, information about an uplink delay for packet transmission between the terminal and the access device of the first packet.

For example, it is assumed that the information related to the first moment includes the information indicating the first moment, for example, the first moment. In this case, the terminal may determine the difference between the first moment and the second moment as the uplink delay for packet transmission between the terminal and the access device of the first packet, where the second moment is the moment at which the terminal sends the first packet to the access device.

Alternatively, for example, it is assumed that the information related to the first moment includes the difference between the first moment and the second moment, where the second moment is the moment at which the terminal sends the first packet to the access device. In this case, the terminal may determine the difference between the first moment and the second moment as the uplink delay for packet transmission between the terminal and the access device of the first packet.

In addition, optionally, in this embodiment of this application, the access device may further obtain information about a transmission delay for packet transmission between the access device and a UPF network element of the first packet, and send the information about the transmission delay to the terminal. This is not specifically limited in this embodiment of this application. Refer to the embodiment shown in FIG. 5A and FIG. 5B or FIG. 6A and FIG. 6B for a manner in which the access device obtains the information about the transmission delay for packet transmission between the access device and the UPF network element for the terminal. Details are not described herein again.

In a possible implementation, the downlink delay monitoring includes steps S1204a to S1206a.

S1204a: The access device sends a second packet to the terminal, and the terminal receives the second packet from the access device. The second packet carries information related to a first moment, and the first moment is a moment at which the access device sends the second packet to the terminal.

Optionally, in this embodiment of this application, the access device may send one packet to the terminal at a moment, or may send a plurality of packets to the terminal at a moment. Therefore, the second packet may be a separate packet sent at a moment, or the second packet may be one of a plurality of packets sent at a moment. This is not specifically limited in this embodiment of this application.

Optionally, the second packet in this embodiment of this application is used for delay monitoring.

In a possible implementation, the second packet carries second indication information, and the second indication information indicates that the second packet is used for delay monitoring. After receiving the second packet, the terminal may learn, based on the second indication information, that the second packet is used for delay monitoring.

Alternatively, in another possible implementation, the second packet does not carry second indication information, but the terminal and the access device negotiate, or agree on, or receive, or configure, in advance, a feature of a packet used for delay monitoring, for example, a sequence number rule of the packet. Then, after receiving the second packet, the terminal may determine, based on a feature of the second packet, for example, a sequence number of the second packet, in combination with a rule that is negotiated or agreed on in advance, that the second packet is used for delay monitoring.

Certainly, the terminal may determine, in another manner, that a received downlink packet is used for delay monitoring. This is not specifically limited in this embodiment of this application.

Optionally, in this embodiment of this application, the information related to the first moment includes information indicating the first moment, for example, the first moment.

S1205a: The terminal determines, based on the information related to the first moment, information about a downlink delay for packet transmission between the terminal and the access device of the second packet.

For example, it is assumed that the information related to the first moment includes the information indicating the first moment, for example, the first moment. In this case, the terminal may determine a difference between the first moment and a second moment as the downlink delay for packet transmission between the terminal and the access device of the second packet, where the second moment is a moment at which the terminal receives the second packet.

S1206a: Optionally, the terminal sends information related to the second moment to the access device, and the access device receives the information related to the second moment from the terminal.

Optionally, in this embodiment of this application, the information related to the second moment includes information indicating the second moment, for example, the second moment, where the second moment is the moment at which the terminal receives the second packet.

Alternatively, optionally, in this embodiment of this application, the information related to the second moment includes the difference between the first moment and the second moment, where the second moment is the moment at which the terminal receives the second packet.

Optionally, in this embodiment of this application, the terminal may send the information related to the second moment to the access device using RRC signaling. Alternatively, the terminal may send the information related to the second moment to the access device by adding the information related to the second moment to an uplink packet (the information related to the first moment may be considered as a timestamp). This is not specifically limited in this embodiment of this application.

Alternatively, in another possible implementation, the downlink delay monitoring includes steps S1204b to S1207b.

S1204b: The access device sends a second packet to the terminal, and the terminal receives the second packet from the access device.

Related descriptions of step S1204b are similar to those of step S1204a, and a difference, for example, lies in that the second packet in step S1204b does not carry information related to a first moment. For other related descriptions, refer to step S1204a. Details are not described herein again.

S1205b: The terminal sends information related to a second moment to the access device, and the access device receives the information related to the second moment from the terminal.

Optionally, in this embodiment of this application, the information related to the second moment includes information indicating the second moment, for example, the second moment, where the second moment is a moment at which the terminal receives the second packet.

Optionally, in this embodiment of this application, the terminal may send the information related to the second moment to the access device using RRC signaling. Alternatively, the terminal may send the information related to the second moment to the access device by adding the information related to the second moment to an uplink packet (the information related to the first moment may be considered as a timestamp). This is not specifically limited in this embodiment of this application.

S1206b: The access device sends the information related to the first moment to the terminal, and the terminal receives the information related to the first moment from the access device.

Optionally, in this embodiment of this application, the information related to the first moment includes a difference between the first moment and the second moment. The second moment is the moment at which the terminal receives the second packet, and the first moment is a moment at which the access device sends the second packet to the terminal.

Optionally, in this embodiment of this application, the access device may send the information related to the first moment to the terminal using RRC signaling. Alternatively, the access device may send the information related to the first moment to the terminal by adding the information related to the first moment to a downlink packet (the information related to the first moment may be considered as a timestamp). This is not specifically limited in this embodiment of this application.

S1207b: The terminal determines, based on the information related to the first moment, information about a downlink delay for packet transmission between the terminal and the access device of the second packet.

For example, it is assumed that the information related to the first moment includes the difference between the first moment and the second moment, where the second moment is the moment at which the terminal receives the second packet, and the first moment is the moment at which the access device sends the second packet to the terminal. In this case, the terminal may determine the difference between the first moment and the second moment as the downlink delay for packet transmission between the terminal and the access device of the second packet.

Alternatively, in another possible implementation, the downlink delay monitoring includes steps S1204c to S1206c.

S1204c: This step is the same as step S1204b. For related descriptions, refer to step S1204b. Details are not described herein again.

S1205c: The access device sends information related to a first moment to the terminal, and the terminal receives the information related to the first moment from the access device.

Optionally, in this embodiment of this application, the information related to the first moment includes information indicating the first moment, for example, the first moment.

Optionally, in this embodiment of this application, the access device may send the information related to the first moment to the terminal using RRC signaling. Alternatively, the access device may send the information related to the first moment to the terminal by adding the information related to the first moment to a downlink packet (the information related to the first moment may be considered as a timestamp). This is not specifically limited in this embodiment of this application.

S1206c: The terminal determines, based on the information related to the first moment, information about a downlink delay for packet transmission between the terminal and the access device of the second packet.

For example, it is assumed that the information related to the first moment includes the information indicating the first moment, for example, the first moment. In this case, the terminal may determine a difference between the first moment and a second moment as the downlink delay for packet transmission between the terminal and the access device of the second packet, where the second moment is a moment at which the terminal receives the second packet.

According to the quality of service monitoring method provided in this embodiment of this application, the terminal may determine information about a transmission delay for packet transmission between the terminal and the access device.

Actions of the terminal or the access device in steps S1201 to S1206a, S1201 to S1207b, or S1201 to S1206c may be performed by the processor 401 in the communications device 400 shown in FIG. 4 by invoking the application program code stored in the memory 403. This is not limited in this embodiment.

Figure 13:
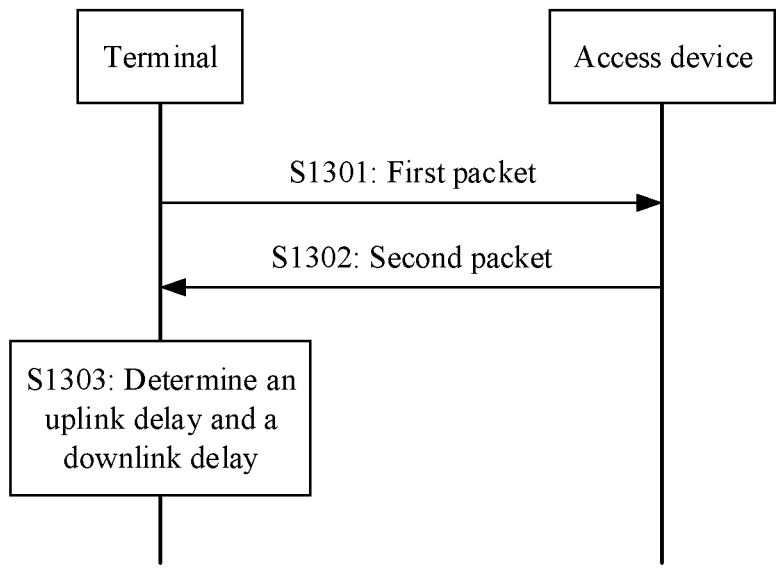
FIG. 13 is a fourth schematic flowchart of a quality of service monitoring method according to an embodiment of this application.

In addition, optionally, the uplink delay monitoring may be combined with the downlink delay monitoring in the quality of service monitoring method shown in FIG. 12. For example, FIG. 13 shows another quality of service monitoring method according to an embodiment of this application. The quality of service monitoring method includes steps S1301 to S1303.

S1301: This step is the same as step S1201 in the embodiment shown in FIG. 12. For related descriptions, refer to step S1201. Details are not described herein again.

S1302: An access device sends a second packet to a terminal, and the terminal receives the second packet from the access device. The second packet carries information indicating a moment at which the access device sends the second packet to the terminal, and carries information indicating a moment at which the access device receives a first packet.

Optionally, the second packet in this embodiment of this application is used for delay monitoring.

In a possible implementation, the second packet carries second indication information, and the second indication information indicates that the second packet is used for delay monitoring. After receiving the second packet, the terminal may learn, based on the second indication information, that the second packet is used for delay monitoring.

Alternatively, in another possible implementation, the second packet does not carry second indication information, but the terminal and the access device negotiate, or agree on, or receive, or configure, in advance, a feature of a packet used for delay monitoring, for example, a sequence number rule of the packet. Then, after receiving the second packet, the terminal may determine, based on a feature of the second packet, for example, a sequence number of the second packet, in combination with a rule that is negotiated or agreed on in advance, that the second packet is used for delay monitoring.

Certainly, the terminal may determine, in another manner, that a received downlink packet is used for delay monitoring. This is not specifically limited in this embodiment of this application.

Optionally, RRC signaling instead of the second packet is used to carry the information indicating the moment at which the access device sends the second packet to the terminal and the information indicating the moment at which the access device receives the first packet. This is not specifically limited in this embodiment of this application.

S1303: The terminal determines, based on the information indicating the moment at which the access device sends the second packet to the terminal and the information indicating the moment at which the access device receives the first packet, information about a downlink delay for packet transmission between the terminal and the access device of the second packet and information about an uplink delay for packet transmission between the terminal and the access device of the first packet.

For example, the terminal may determine, based on a moment at which the first packet is sent and the information indicating the moment at which the access device receives the first packet, the information about the uplink delay for packet transmission between the terminal and the access device of the first packet.

Alternatively, for example, the terminal may determine, based on a moment at which the second packet is received and the information indicating the moment at which the access device sends the second packet to the terminal, information about a downlink delay for packet transmission between the terminal and the access device of the second packet.

Optionally, in this embodiment of this application, after determining the information about the downlink delay and the information about the uplink delay for packet transmission between the terminal and the access device, the terminal may further report, to the access device, the information about the downlink delay and the information about the uplink delay. Further, optionally, the access device may report, to a control plane network element, the information about the downlink delay and the information about the uplink delay. This is not specifically limited in this embodiment of this application.

According to the quality of service monitoring method provided in this embodiment of this application, the terminal may determine information about a transmission delay for packet transmission between the terminal and the access device for the terminal.

Actions of the terminal or the access device in steps S1301 to S1303 may be performed by the processor 401 in the communications device 400 shown in FIG. 4 by invoking the application program code stored in the memory 403. This is not limited in this embodiment.

In addition, in the embodiment shown in FIG. 5A and FIG. 5B or FIG. 6A and FIG. 6B, for a manner in which the access device obtains information about a transmission delay for packet transmission between the terminal and the access device for the terminal, reference may also be made to a manner, provided in the embodiment shown in FIG. 12 or FIG. 13, in which the access device determines information about the uplink delay or information about the downlink delay for packet transmission between the terminal and the access device for the terminal. General description is provided herein, and details are not described below again.

Optionally, an embodiment of this application may further provide a quality of service monitoring method, including: obtaining, by an access device, information about a first transmission delay for packet transmission between the access device and a terminal for the terminal; obtaining, by the access device, information about a second transmission delay for packet transmission between the access device and a user plane network element for the terminal; and sending, by the access device, the information about the first transmission delay and the information about the second transmission delay to a control plane network element. Refer to the embodiment shown in FIG. 12 or FIG. 13 for related implementation of the obtaining, by an access device, information about a first transmission delay for packet transmission between the access device and a terminal for the terminal. Refer to the embodiment shown in FIG. 5A and FIG. 5B or FIG. 6A and FIG. 6B for related implementation of the obtaining, by the access device, information about a second transmission delay for packet transmission between the access device and a user plane network element for the terminal. Details are not described herein again. Based on this solution, in a transmission delay monitoring process, as an intermediate device, the access device can directly obtain information about transmission delays between the access device and devices on two sides of the access device of the access device, and then report the delays. This avoids a case in which a device on each of the two sides can report a segment transmission delay or an end-to-end transmission delay only after obtaining a delay of a segment in which the device is not located, thereby simplifying a delay monitoring mechanism.

The foregoing mainly describes the solutions provided in the embodiments of this application from the perspective of interaction between network elements. It may be understood that, to implement the foregoing functions, the foregoing first device, third device, session management network element, or terminal includes corresponding hardware structures and/or software modules for performing the functions. A person skilled in the art should be easily aware that units and algorithm steps in the examples described with reference to the embodiments disclosed in this specification may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first device, third device, session management network element, or terminal may be divided into function modules based on the foregoing method examples. For example, each function module may be obtained through division based on a corresponding function, or two or more functions may be integrated into one processing module. The integrated module may be implemented in a form of hardware, or may be implemented in a form of a software function module. It should be noted that, in the embodiments of this application, module division is used an example and is merely a logical function division. In actual implementation, another division manner may be used.

Figure 8:
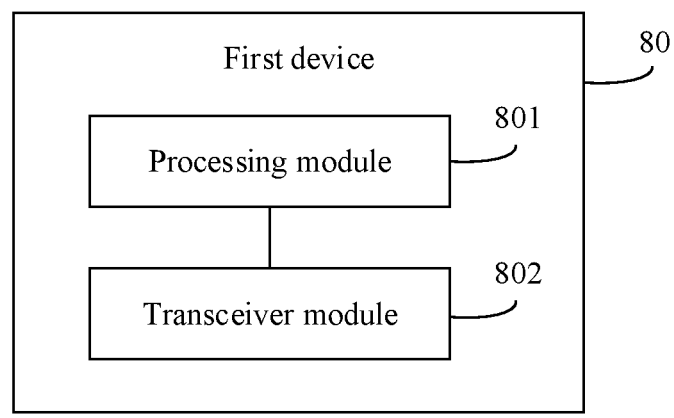
FIG. 8 is a schematic structural diagram of a first device according to an embodiment of this application.

For example, if function modules are obtained through division in an integrated manner, FIG. 8 is a schematic structural diagram of a first device 80. The first device 80 includes a processing module 801 and a transceiver module 802. The processing module 801 is configured to obtain information about a first transmission delay for packet transmission between the first device 80 and a second device for the terminal. The transceiver module 802 is configured to: send the information about the first transmission delay to a third device; and send, at a first moment, information related to the first moment to the third device. The information about the first transmission delay and the information related to the first moment are used to determine information about a second transmission delay for packet transmission between the second device and the third device for the terminal.

Optionally, the transceiver module 802 is further configured to: receive a first message from the third device at a second moment, where the first message requests to monitor the second transmission delay. The information related to the first moment includes the first moment and the second moment, or a difference between the first moment and the second moment.

Alternatively, optionally, the transceiver module 802 is further configured to receive a first message from the third device at a second moment, where the first message requests to monitor a third transmission delay for packet transmission between the first device 80 and the third device for the terminal. The information related to the first moment includes the first moment and a third moment, or a difference between the first moment and a third moment.

Optionally, the transceiver module 802 is configured to send the information about the first transmission delay to a third device. That the transceiver module 802 is configured to send, at a first moment, information related to the first moment to the third device includes: sending a third message to the third device at the first moment, where the third message includes the information about the first transmission delay and the information related to the first moment.

Alternatively, optionally, the transceiver module 802 is configured to send the information about the first transmission delay to a third device. That the transceiver module 802 is configured to send, at a first moment, information related to the first moment to the third device includes: sending a fourth message to the third device, where the fourth message includes the information about the first transmission delay; and sending a fifth message to the third device at the first moment, where the fifth message includes the information related to the first moment.

Optionally, the transceiver module 802 is further configured to receive a to-be-monitored quality of service parameter from a session management network element, where the to-be-monitored quality of service parameter includes the first transmission delay. That the processing module 801 is configured to obtain information about a first transmission delay for packet transmission between the first device 80 and a second device for the terminal includes: obtaining the information about the first transmission delay based on the to-be-monitored quality of service parameter.

Optionally, the transceiver module 802 is further configured to receive third indication information from the session management network element, where the third indication information indicates to the first device 80 to send, after detecting the information about the first transmission delay, the information about the first transmission delay to the third device.

Optionally, the transceiver module 802 is further configured to receive, from the session management network element, an event for reporting a monitoring report, where the event includes: the information about the first transmission delay exceeds a preset threshold; the terminal enters an idle mode or a session is released; or periodic reporting is performed.

Optionally, the transceiver module 802 is further configured to receive, from the session management network element, a length of a monitoring packet used for quality of service monitoring.

All related content of the steps in the foregoing method embodiments may be cited in function descriptions of corresponding function modules. Details are not described herein again.

In this embodiment, the first device 80 is presented in a form of function modules obtained through division in an integrated manner. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the first device 80 may be in a form shown in FIG. 4.

For example, the processor 401 in FIG. 4 may invoke the computer-executable instruction stored in the memory 403, such that the first device 80 performs the quality of service monitoring methods in the foregoing method embodiments.

Functions/implementation processes of the transceiver module 802 and the processing module 801 in FIG. 8 may be implemented by the processor 401 in FIG. 4 by invoking the computer-executable instruction stored in the memory 403. Alternatively, a function/an implementation process of the processing module 801 in FIG. 8 may be implemented by the processor 401 in FIG. 4 by invoking the computer-executable instruction stored in the memory 403, and a function/an implementation process of the transceiver module 802 in FIG. 8 may be implemented by the communications interface 404 in FIG. 4.

The first device 80 provided in this embodiment may perform the foregoing quality of service monitoring methods. Therefore, for a technical effect that can be obtained by the first device 80, refer to the foregoing method embodiments. Details are not described herein again.

Optionally, an embodiment of this application further provides an apparatus (for example, the apparatus may be a chip system). The apparatus includes a processor, configured to support a first device in performing the quality of service monitoring methods, for example, obtaining information about a first transmission delay for packet transmission between the first device and a second device for a terminal. In a possible design, the apparatus further includes a memory. The memory is configured to store a program instruction and data that are necessary for the first device. Certainly, the memory may alternatively be not in the apparatus. When the apparatus is a chip system, the apparatus may include a chip, or may include a chip and another discrete device. This is not specifically limited in this embodiment of this application.

Figure 9:
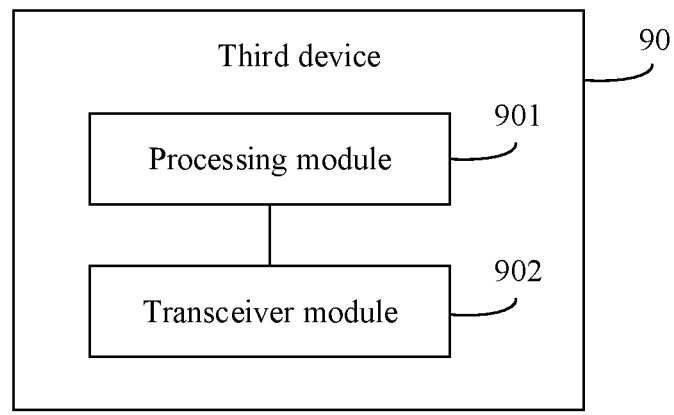
FIG. 9 is a schematic structural diagram of a third device according to an embodiment of this application.

Alternatively, for example, if function modules are obtained through division in an integrated manner, FIG. 9 is a schematic structural diagram of a third device 90. The third device 90 includes a transceiver module 902 and a processing module 901. The transceiver module 902 is configured to receive, from a first device, information about a first transmission delay for packet transmission between the first device and a second device for a terminal. The transceiver module 902 is further configured to receive information related to a first moment from the first device. The processing module 901 is configured to determine, based on the information about the first transmission delay and the information related to the first moment, information about a second transmission delay for packet transmission between the second device and the third device 90 for the terminal.

Optionally, the transceiver module 902 is further configured to send a first message to the first device, where the first message requests to obtain the information about the second transmission delay. The information related to the first moment includes the first moment and a second moment, or a difference between the first moment and a second moment, where the second moment is a moment at which the first device receives the first message.

Optionally, the transceiver module 902 is further configured to send a second message to the first device, where the second message requests to obtain information about a third transmission delay for packet transmission between the first device and the third device 90 for the terminal. The information related to the first moment includes the first moment and a third moment, or a difference between the first moment and a third moment, where the third moment is a moment at which the first device receives the second message.

Optionally, the transceiver module 902 is configured to receive, from the first device, the information about the first transmission delay for packet transmission between the first device and the second device for the terminal. That the transceiver module 902 is further configured to receive information related to a first moment from the first device includes: receiving a third message from the first device, where the third message includes the information about the first transmission delay and the information related to the first moment.

Optionally, the transceiver module 902 is configured to receive, from the first device, the information about the first transmission delay for packet transmission between the first device and the second device for the terminal. That the transceiver module 902 is further configured to receive information related to a first moment from the first device includes: receiving a fourth message from the first device, where the fourth message includes the information about the first transmission delay; and receiving a fifth message from the first device, where the fifth message includes the information related to the first moment.

All related content of the steps in the foregoing method embodiments may be cited in function descriptions of corresponding function modules. Details are not described herein again.

In this embodiment, the third device 90 is presented in a form of function modules obtained through division in an integrated manner. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the third device 90 may be in a form shown in FIG. 4.

For example, the processor 401 in FIG. 4 may invoke the computer-executable instruction stored in the memory 403, such that the third device 90 performs the quality of service monitoring methods in the foregoing method embodiments.

Functions/implementation processes of the transceiver module 902 and the processing module 901 in FIG. 9 may be implemented by the processor 401 in FIG. 4 by invoking the computer-executable instruction stored in the memory 403. Alternatively, a function/an implementation process of the processing module 901 in FIG. 9 may be implemented by the processor 401 in FIG. 4 by invoking the computer-executable instruction stored in the memory 403, and a function/an implementation process of the transceiver module 902 in FIG. 9 may be implemented by the communications interface 404 in FIG. 4.

The third device 90 provided in this embodiment may perform the foregoing quality of service monitoring methods. Therefore, for a technical effect that can be obtained by the third device 90, refer to the foregoing method embodiments. Details are not described herein again.

Optionally, an embodiment of this application further provides an apparatus (for example, the apparatus may be a chip system). The apparatus includes a processor, configured to support a third device in performing the quality of service monitoring methods, for example, determining, based on information about a first transmission delay and information related to a first moment, information about a second transmission delay for packet transmission between a second device and the third device for the terminal. In a possible design, the apparatus further includes a memory. The memory is configured to store a program instruction and data that are necessary for the third device. Certainly, the memory may alternatively be not in the apparatus. When the apparatus is a chip system, the apparatus may include a chip, or may include a chip and another discrete device. This is not specifically limited in this embodiment of this application.

Figure 10:
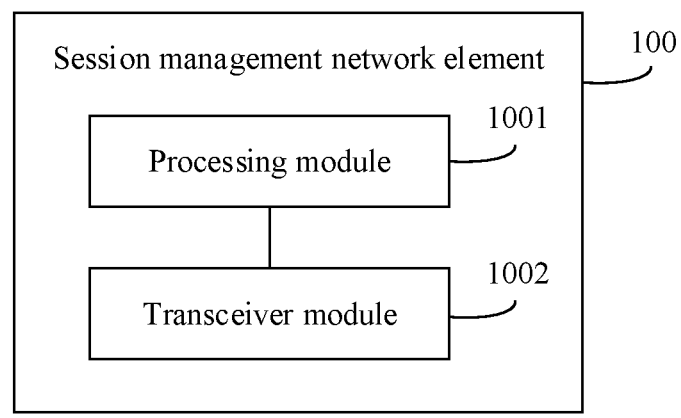
FIG. 10 is a schematic structural diagram of a session management network element according to an embodiment of this application.

Alternatively, for example, if function modules are obtained through division in an integrated manner, FIG. 10 is a schematic structural diagram of a session management network element 100. The session management network element 100 includes a processing module 1001 and a transceiver module 1002. The transceiver module 1002 is configured to receive one or more quality of service monitoring policies from a policy control network element. The processing module 1001 is configured to determine a first quality of service monitoring policy corresponding to a first device from the one or more quality of service monitoring policies. The transceiver module 1002 is further configured to send the first quality of service monitoring policy to the first device.

Optionally, the first quality of service monitoring policy includes at least one of a to-be-monitored first quality of service parameter corresponding to the first device or an event in which the first device reports a monitoring report to the session management network element 100.

Optionally, the event includes: the quality of service parameter exceeds a preset threshold; a terminal enters an idle mode or a session is released; or periodic reporting is performed.

Optionally, the to-be-monitored first quality of service parameter includes at least one of a GFBR, an MFBR, data burst volume within a packet delay budget at an access point, a FER, a segment transmission delay, or packet loss information.

Optionally, when the to-be-monitored first quality of service parameter includes a segment transmission delay, the segment transmission delay is a first transmission delay for packet transmission between the first device and a second device for a terminal.

Optionally, the transceiver module 1002 is further configured to send third indication information to the first device, where the third indication information indicates to the first device to send, after detecting information about the first transmission delay, the information about the first transmission delay to a third device.

Optionally, the first quality of service monitoring policy further includes a length of a monitoring packet used for quality of service monitoring.

Optionally, the quality of service monitoring policy includes information about the first device. That the processing module 1001 is configured to determine a first quality of service monitoring policy corresponding to a first device from the one or more quality of service monitoring policies includes: determining, based on the information about the first device, the first quality of service monitoring policy from the one or more quality of service monitoring policies.

Optionally, the first quality of service monitoring policy includes the to-be-monitored first quality of service parameter corresponding to the first device. That the processing module 1001 is configured to determine a first quality of service monitoring policy corresponding to a first device from the one or more quality of service monitoring policies includes: determining, based on a parameter type of the first quality of service parameter, the to-be-monitored first quality of service parameter corresponding to the first device.

All related content of the steps in the foregoing method embodiments may be cited in function descriptions of corresponding function modules. Details are not described herein again.

In this embodiment, the session management network element 100 is presented in a form of function modules obtained through division in an integrated manner. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the session management network element 100 may be in the form shown in FIG. 4.

For example, the processor 401 in FIG. 4 may invoke the computer-executable instruction stored in the memory 403, such that the session management network element 100 performs the quality of service monitoring activation method in the foregoing method embodiment.

Functions/implementation processes of the transceiver module 1002 and the processing module 1001 in FIG. 10 may be implemented by the processor 401 in FIG. 4 by invoking the computer-executable instruction stored in the memory 403. Alternatively, a function/an implementation process of the processing module 1001 in FIG. 10 may be implemented by the processor 401 in FIG. 4 by invoking the computer-executable instruction stored in the memory 403, and a function/an implementation process of the transceiver module 1002 in FIG. 10 may be implemented by the communications interface 404 in FIG. 4.

The session management network element 100 provided in this embodiment may perform the foregoing quality of service monitoring activation method. Therefore, for a technical effect that can be obtained by the session management network element 100, refer to the foregoing method embodiment. Details are not described herein again.

Optionally, an embodiment of this application further provides an apparatus (for example, the apparatus may be a chip system). The apparatus includes a processor, configured to support a session management network element in performing the quality of service monitoring activation method, for example, determining a first quality of service monitoring policy corresponding to a first device from quality of service monitoring policies. In a possible design, the apparatus further includes a memory. The memory is configured to store a program instruction and data that are necessary for the session management network element. Certainly, the memory may alternatively be not in the apparatus. When the apparatus is a chip system, the apparatus may include a chip, or may include a chip and another discrete device. This is not specifically limited in this embodiment of this application.

Figure 14:
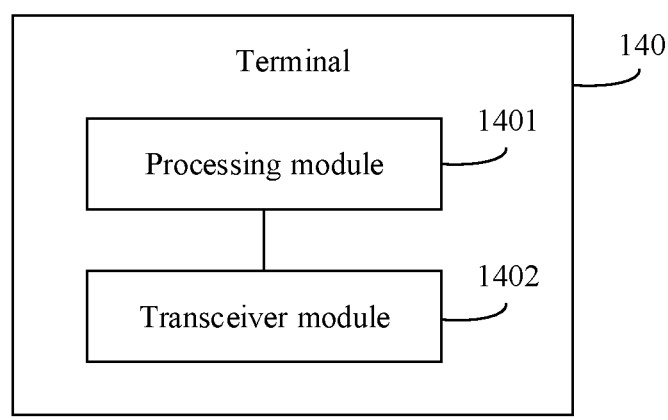
FIG. 14 is a schematic structural diagram of a terminal according to an embodiment of this application.

For example, if function modules are obtained through division in an integrated manner, FIG. 14 is a schematic structural diagram of a terminal 140. The terminal 140 includes a processing module 1401 and a transceiver module 1402. The transceiver module 1402 is configured to receive information related to a first moment from an access device, where the first moment is a moment at which the access device receives a first packet sent by the terminal, or a moment at which the access device sends a second packet to the terminal. The processing module 1401 is configured to determine, based on the information related to the first moment, information about a transmission delay for packet transmission between the terminal and the access device for the terminal.

Optionally, when the first moment is the moment at which the access device receives the first packet sent by the terminal, the processing module 1401 is configured to determine, based on the information related to the first moment, information about an uplink delay corresponding to the first packet when the first packet is transmitted between the terminal and the access device.

Alternatively, optionally, when the first moment is the moment at which the access device sends the second packet to the terminal, the processing module 1401 is configured to determine, based on the information related to the first moment, information about a downlink delay corresponding to the second packet when the second packet is transmitted between the terminal and the access device.

Optionally, the information related to the first moment includes a difference between the first moment and a third moment, where the third moment is a moment at which the terminal receives the second packet sent by the access device. The transceiver module 1402 is further configured to receive the second packet from the access device. The transceiver module is further configured to send, to the access device, information indicating the third moment, where the third moment is the moment at which the terminal receives the second packet sent by the access device.

Optionally, the information related to the first moment includes information used to indicate the first moment. That the transceiver module 1402 is configured to receive information related to a first moment from an access device includes: receiving the second packet from the access device, where the second packet carries the information used to indicate the first moment.

Optionally, the transceiver module 1402 is further configured to send the information about the downlink delay to the access device.

Optionally, that the transceiver module 1402 is configured to receive information related to a first moment from an access device includes: receiving a third packet from the access device, where the third packet carries the information related to the first moment; or receiving RRC signaling from the access device, where the RRC signaling carries the formation related to the first moment.

All related content of the steps in the foregoing method embodiments may be cited in function descriptions of corresponding function modules. Details are not described herein again.

In this embodiment, the terminal 140 is presented in a form of function modules obtained through division in an integrated manner. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the terminal 140 may be in a form shown in FIG. 4.

For example, the processor 401 in FIG. 4 may invoke the computer-executable instruction stored in the memory 403, such that the terminal 140 performs the quality of service monitoring methods in the foregoing method embodiments.

Functions/implementation processes of the transceiver module 1402 and the processing module 1401 in FIG. 14 may be implemented by the processor 401 in FIG. 4 by invoking the computer-executable instruction stored in the memory 403. Alternatively, a function/an implementation process of the processing module 1401 in FIG. 14 may be implemented by the processor 401 in FIG. 4 by invoking the computer-executable instruction stored in the memory 403, and a function/an implementation process of the transceiver module 1402 in FIG. 14 may be implemented by the communications interface 404 in FIG. 4.

The terminal 140 provided in this embodiment may perform the foregoing quality of service monitoring methods. Therefore, for a technical effect that can be obtained by the terminal 140, refer to the foregoing method embodiments. Details are not described herein again.

Optionally, an embodiment of this application further provides an apparatus (for example, the apparatus may be a chip system). The apparatus includes a processor, configured to support a terminal in performing the quality of service monitoring methods, for example, determining, based on information related to a first moment, information about a transmission delay for packet transmission between the terminal and an access device for the terminal. In a possible design, the apparatus further includes a memory. The memory is configured to store a program instruction and data that are necessary for the terminal. Certainly, the memory may alternatively be not in the apparatus. When the apparatus is a chip system, the apparatus may include a chip, or may include a chip and another discrete device. This is not specifically limited in this embodiment of this application.

All or some of the foregoing embodiments may be implemented using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to features and the embodiments thereof, it is clear that various modifications and combinations may be made to them without departing from the spirit and scope of this application. Correspondingly, the specification and accompanying drawings are merely example description of this application defined by the accompanying claims, and are intended to cover any or all of modifications, variations, combinations or equivalents within the scope of this application. Additionally, various modifications and variations to this application can be made without departing from the spirit and scope of this application. This application is intended to cover these modifications and variations of this application provided that they fall within the scope of protection defined by the following claims and their equivalent technologies.

What is claimed is:

1. A quality of service monitoring method comprising:
sending, by a user plane network device, a first packet to a first device at a first moment T1, wherein the first packet indicates a first monitoring granularity that is per device, per session, or per flow, wherein the first packet comprises a first segment identifier identifying a first segment and corresponding to a first transmission delay for a first packet transmission along the first segment, wherein the first segment is between the first device and a second device, wherein the first device is an access device, and wherein the second device is a terminal;
receiving, by the first device, the first packet from the user plane network device at a second moment T2;
obtaining, by the first device in response to the first packet, the first transmission delay;
sending, by the first device, a second packet to the user plane network device at a third moment T3, wherein the second packet comprises the first transmission delay, a second segment identifier, the second moment T2, and the third moment T3 and indicates a second monitoring granularity for the first transmission delay, wherein the second segment identifier identifies a second segment and corresponds to a second transmission delay for a second packet transmission along the second segment, wherein the second segment is between the first device and the user plane network device, and wherein the second monitoring granularity is the same as the first monitoring granularity;
receiving, by the user plane network device, the second packet from the first device at a fourth moment T4;
determining, by the user plane network device based on the first moment T1, the second moment T2, the third moment T3, and the fourth moment T4, the second transmission delay; and
determining, by the user plane network device based on the first transmission delay and the second transmission delay, a third transmission delay for a third packet transmission between the second device and the user plane network device.

2. The quality of service monitoring method according to claim 1, wherein the first packet comprises a quality of service (QOS) flow identifier (QFI) to request QoS monitoring for a QoS flow identified by the QFI.

3. The quality of service monitoring method according to claim 1, wherein the first transmission delay is a one-way downlink air interface transmission delay between the first device and the second device or a one-way uplink air interface transmission delay between the first device and the second device.

4. The quality of service monitoring method according to claim 1, wherein the second transmission delay is one of: a one-way downlink transmission delay between the first device and the user plane network device; a one-way uplink transmission delay between the first device and the user plane network device; or a round-trip delay between the first device and the user plane network device.

5. The quality of service monitoring method according to claim 1, further comprising:
receiving, by the user plane network device, a first parameter for quality of service (QOS) monitoring for the user plane network device from a session management function device; and
receiving, by the first device, a second parameter for QoS monitoring for the first device from the session management function device.

6. The quality of service monitoring method according to claim 5, further comprising determining, by the session management function device, the first parameter and the second parameter.

7. The quality of service monitoring method according to claim 6, wherein determining the first parameter and the second parameter comprises:
receiving, by the session management function device, a policy from a policy control network device; and
determining, by the session management function device, the first parameter and the second parameter based on the policy.

8. The quality of service monitoring method according to claim 1, further comprising reporting, by the user plane network device, the third transmission delay to a session management function device when a condition for reporting is met.

9. A system for quality of service monitoring and comprising:
a user plane network device configured to send a first packet to a first device at a first moment T1, wherein the first packet indicates a first monitoring granularity that is per device, per session, or per flow, wherein the first packet comprises a first segment identifier identifying a first segment and corresponding to a first transmission delay for a first packet transmission along the first segment, wherein the first segment is between the first device and a second device, wherein the first device is an access device, and wherein the second device is a terminal; and the first device configured to:
receive the first packet from the user plane network device at a second moment T2;
obtain, in response to the first packet, the first transmission delay; and
send a second packet to the user plane network device at a third moment T3, wherein the second packet comprises the first transmission delay, a second segment identifier, the second moment T2, and the third moment T3 and indicates a second monitoring granularity for the first transmission delay, wherein the second segment identifier identifies a second segment and corresponds to a second transmission delay for a second packet transmission along the second segment, wherein the second segment is between the first device and the user plane network device, and wherein the second monitoring granularity is the same as the first monitoring granularity, wherein the user plane network device is further configured to:
receive the second packet from the first device at a fourth moment T4;
determine, based on the first moment T1, the second moment T2, the third moment T3, and the fourth moment T4, the second transmission delay; and
determine, based on the first transmission delay and the second transmission delay, a third transmission delay for a third packet transmission between the second device and the user plane network device.

10. The system according to claim 9, wherein the first packet comprises a quality of service (QOS) flow identifier (QFI) to request QoS monitoring for a QoS flow identified by the QFI.

11. The system according to claim 9, wherein the first transmission delay is a one-way downlink air interface transmission delay between the first device and the second device or a one-way uplink air interface transmission delay between the first device and the second device.

12. The system according to claim 9, wherein the second transmission delay is one of: a one-way downlink transmission delay between the first device and the user plane network device; a one-way uplink transmission delay between the first device and the user plane network device; or a round-trip delay between the first device and the user plane network device.

13. The system according to claim 9, wherein the user plane network device is further configured to receive a first parameter for quality of service (QOS) monitoring for the user plane network device from a session management function device, and wherein the first device is further configured to receive a second parameter for QOS monitoring for the first device from the session management function device.

14. The system according to claim 13, further comprising the session management function device, wherein the session management function device is configured to determine the first parameter and the second parameter.

15. The system according to claim 9, wherein the user plane network device is further configured to report the third transmission delay to a session management function device when a condition for reporting is met.

16. The system according to claim 9, wherein the first packet is a monitoring packet, and wherein the second packet is a monitoring response packet.

17. A quality of service monitoring method comprising:
receiving, by a first device at a second moment T2, a first packet from a user plane network device, wherein the first packet indicates a first monitoring granularity that is per device, per session, or per flow, wherein the first packet comprises a first segment identifier identifying a first segment and corresponding to a first transmission delay for a first packet transmission along the first segment, wherein the first segment is between the first device and a second device, wherein the first device is an access device, and wherein the second device is a terminal;
obtaining, by the first device in response to the first packet, the first transmission delay; and
sending, by the first device, a second packet to the user plane network device at a third moment T3,
wherein the second packet comprises the first transmission delay, a second segment identifier, the second moment T2, and the third moment T3,
wherein the second segment identifier identifies a second segment and corresponds to a second transmission delay for a second packet transmission along the second segment,
wherein the second segment is between the first device and the user plane network device,
wherein the second packet indicates a second monitoring granularity for the first transmission delay, and
wherein the second monitoring granularity is the same as the first monitoring granularity.

18. The quality of service monitoring method according to claim 17, wherein the first packet is a monitoring packet, and wherein the second packet is a monitoring response packet.

19. The quality of service monitoring method according to claim 17, wherein the first transmission delay is a one-way downlink air interface transmission delay between the first device and the second device or a one-way uplink air interface transmission delay between the first device and the second device.

20. A first device comprising:
one or more memories configured to store programming instructions; and
at least one processor coupled to the one or more memories and configured to execute the programming instructions to cause the first device to:
receive, at a second moment T2, a first packet from a user plane network device, wherein the first packet indicates a first monitoring granularity that is per device, per session, or per flow, wherein the first packet comprises a first segment identifier identifying a first segment and corresponding to a first transmission delay for a first packet transmission along the first segment, wherein the first segment is between the first device and a second device, wherein the first device is an access device, and wherein the second device is a terminal;
obtain, in response to the first packet, the first transmission delay; and
send, a second packet to the user plane network device at a third moment T3,
wherein the second packet comprises the first transmission delay, a second segment identifier, the second moment T2, and the third moment T3, wherein the second segment identifier identifies a second segment and corresponds to a second transmission delay for a second packet transmission along the second segment, wherein the second segment is between the first device and the user plane network device, wherein the second packet indicates a second monitoring granularity for the first transmission delay, and wherein the second monitoring granularity is the same as the first monitoring granularity.

21. The first device according to claim 20, wherein the first packet is a monitoring packet, and wherein the second packet is a monitoring response packet.

22. The first device according to claim 20, wherein the first transmission delay is a one-way downlink air interface transmission delay between the first device and the second device or a one-way uplink air interface transmission delay between the first device and the second device.

* * * * *